(12) United States Patent
Kumar et al.

(10) Patent No.: US 11,144,490 B2
(45) Date of Patent: Oct. 12, 2021

(54) OPTIMAL I3C IN-BAND INTERRUPT HANDLING THROUGH REDUCED SLAVE ARBITRATION CYCLES

(71) Applicant: QUALCOMM Incorporated, San Diego, CA (US)

(72) Inventors: Sandeep Kumar, Navi Mumbai (IN); Suman Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/738,470

(22) Filed: Jan. 9, 2020

(65) Prior Publication Data

US 2021/0216490 A1    Jul. 15, 2021

(51) Int. Cl.

| G06F 13/374 | (2006.01) |
|---|---|
| G06F 13/42 | (2006.01) |
| G06F 11/30 | (2006.01) |
| G06F 13/24 | (2006.01) |
| G06F 13/26 | (2006.01) |
| G06F 13/40 | (2006.01) |
| G06F 9/38 | (2018.01) |
| G06F 9/46 | (2006.01) |

(52) U.S. Cl.
CPC ........ *G06F 13/374* (2013.01); *G06F 11/3027* (2013.01); *G06F 13/24* (2013.01); *G06F 13/26* (2013.01); *G06F 13/4282* (2013.01); G06F 9/3877 (2013.01); G06F 9/466 (2013.01); G06F 13/4031 (2013.01)

(58) Field of Classification Search
CPC .... G06F 9/3877; G06F 9/466; G06F 11/3027; G06F 13/24; G06F 13/26; G06F 13/368; G06F 13/374; G06F 13/4031; G06F 13/4282
See application file for complete search history.

(56) References Cited

U.S. PATENT DOCUMENTS

| 10,496,562 | B1 * | 12/2019 | Graif | G06F 13/364 |
|---|---|---|---|---|
| 10,725,949 | B2 * | 7/2020 | Graif | G06F 1/3287 |
| 10,963,419 | B1 * | 3/2021 | Chin | G06F 13/4291 |
| 2014/0337553 | A1 * | 11/2014 | Du | G06F 13/24 710/267 |
| 2015/0199287 | A1 * | 7/2015 | Sengoku | G06F 13/4068 710/110 |

(Continued)

*Primary Examiner* — Thomas J. Cleary
(74) *Attorney, Agent, or Firm* — Qualcomm Incorporated

(57) ABSTRACT

Systems, methods, and apparatus for serial bus arbitration are described. A data communication apparatus has a bus interface circuit that uses a line driver to couple the apparatus to a data line of a serial bus. A processor in a slave device is configured to cause the apparatus to assert an in-band interrupt request on a serial bus operated in accordance with an I3C protocol, transmit a slave address of the slave device over a data line of the serial bus during a first bus arbitration transaction conducted after the in-band interrupt request is asserted, ignore signaling state of the data line while transmitting the slave address and participate in one or more transactions conducted responsive to assertion of the in-band interrupt request and transmission of the slave address. At least one other slave device transmits an address over the data line during the first bus arbitration transaction.

28 Claims, 23 Drawing Sheets

(56) References Cited

U.S. PATENT DOCUMENTS

| | | | |
|---|---|---|---|
| 2016/0147684 A1* | 5/2016 | Sengoku | G06F 1/14 710/105 |
| 2019/0213165 A1* | 7/2019 | Pitigoi-Aron | G06F 13/376 |
| 2020/0073833 A1* | 3/2020 | Graif | G06F 13/4291 |
| 2020/0089632 A1* | 3/2020 | Graif | G06F 13/362 |

* cited by examiner

OPTIMAL I3C IN-BAND INTERRUPT HANDLING THROUGH REDUCED SLAVE ARBITRATION CYCLES

TECHNICAL FIELD

The present disclosure relates generally to an interface between processing circuits and peripheral devices and, more particularly, to in-band interrupt arbitration on a serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus operated in accordance with Inter-Integrated Circuit (I2C bus or I$^2$C) protocols. The I2C bus architecture was developed to connect low-speed peripherals to a processor, and the I2C bus can operate as a multi-drop bus. A two-wire I2C bus includes a Serial Data Line (SDA) that carries a data signal, and a Serial Clock Line (SCL) that carries a clock signal.

A serial bus may employ a multi-master protocol in which one or more devices can serve as a master and a slave for different messages transmitted on the serial bus. In one example, Improved Inter-Integrated Circuit (I3C) protocols may be used to control operations on a serial bus. I3C protocols are defined by the Mobile Industry Processor Interface (MIPI) Alliance and derive certain implementation aspects from the I2C protocol. Original implementations of the I2C protocol supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

In another example, the Radio Frequency Front-End (RFFE) interface defined by the MIPI Alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links.

In another example of a serial bus, the system power management interface (SPMI) defined by the MIPI Alliance provides a hardware interface that may be implemented between baseband or application processors and peripheral components. In some implementations, the SPMI is deployed to support power management operations within a device. In another example of a serial bus, the System Management Bus (SMB) is a single-ended two-wire bus derived from the I2C bus. A serial bus controlled by SMB protocols may be used to provide low-bandwidth, simplified communications from a processor to components. For example, a serial bus operated in accordance with an SMB protocol may carry on-off signaling between a processor and a power supply. In another example, a serial bus operated in accordance with an SMB protocol may be used for sideband signaling of alerts, events, status messages, control messages, etc. between devices coupled by one or more high-speed communication links.

As applications have become more complex, there is a continually increasing demand for improved bus management techniques that can reduce bus latency.

SUMMARY

Certain aspects of the disclosure relate to systems, apparatus, methods and techniques that provide optimized adaptive address arbitration on a serial bus. The disclosed adaptive address arbitration procedures can reduce bus latency.

In various aspects of the disclosure, a method for bus arbitration performed at a slave device includes asserting an in-band interrupt request on a serial bus operated in accordance with an I3C protocol, transmitting a slave address associated with the slave device over a data line of the serial bus during a first bus arbitration transaction conducted after the in-band interrupt request is asserted, ignoring signaling state of the data line while transmitting the slave address, and participating in one or more transactions responsive to assertion of the in-band interrupt request and transmission of the slave address. At least one other slave device transmits an address over the data line during the first bus arbitration transaction.

In certain examples, the method includes monitoring signaling state of the data line during a second bus arbitration transaction, and withdrawing from the second bus arbitration transaction after detecting transmission of a higher-priority slave address on the data line during the second bus arbitration transaction. The method may include transmitting a non-zero bit of the slave address over the data line during a second bus arbitration transaction, and withdrawing from the second bus arbitration transaction after detecting that a signaling state of the data line is indicative of a zero bit while the non-zero bit of the slave address is being transmitted.

In certain examples, each of a plurality of slave devices is uniquely identifiable by location of a zero-value bit in its corresponding slave address. The method may include receiving a negative acknowledgement responsive to the first bus arbitration transaction. The one or more transactions may follow the negative acknowledgement in transmission. The method may include transmitting a payload byte mandated by protocol in response to a read command in the one or more transactions. The method may include clearing an interrupt source in response to a read command transmitted by a bus master in the one or more transactions.

In various aspects of the disclosure, an apparatus configured for data communication includes a bus interface circuit having a line driver configured to couple the apparatus to a data line of a serial bus, and a processor. The processor may be configured to assert an in-band interrupt request on a serial bus operated in accordance with an I3C protocol, transmit a slave address associated with the slave device over a data line of the serial bus during a first bus arbitration transaction conducted after the in-band interrupt request is asserted ignore signaling state of the data line while transmitting the slave address, and participate in one or more transactions responsive to assertion of the in-band interrupt request and transmission of the slave address.

In various aspects of the disclosure, a method for bus arbitration performed at a slave device includes detecting an in-band interrupt request from a serial bus operated in accordance with I3C protocols, receiving a composite address generated by two or more slave devices that participate in a first bus arbitration transaction conducted in response to the in-band interrupt request, identifying the two or more slave devices from zero-value bits in the composite address, and initiating one or more transactions responsive to the in-band interrupt request. Each of the two or more slave devices transmit their respective slave addresses concurrently over a data line of the serial bus during the first bus arbitration transaction.

In certain examples, the method includes configuring each of the plurality of slave devices to ignore signaling state of the data line of the serial bus while transmitting its respective slave address. The method may include reading a mandatory byte from at least one of the two or more slave devices after identifying the two or more slave devices. The mandatory byte may be provided in accordance with a protocol (such as an I3C protocol) that governs in-band interrupts. The method may include clearing an interrupt source in at least one of the two or more slave devices after identifying the two or more slave devices. The method may include providing a negative acknowledgement after receiving the composite address in the first bus arbitration transaction. The method may include assigning a slave address to each of a plurality of slave devices coupled to the serial bus, and configuring each of the plurality of slave devices with its assigned slave address. Each of the plurality of slave devices is uniquely identifiable by location of a zero-value bit in its assigned slave address.

In various aspects of the disclosure, a processor-readable storage medium includes code which, when executed by a processor, causes the processor to detect an in-band interrupt request from a serial bus operated in accordance with I3C protocols, receive a composite address generated by two or more slave devices that participate in a first bus arbitration transaction conducted in response to the in-band interrupt request, identify the two or more slave devices from zero-value bits in the composite address, and initiate one or more transactions responsive to the in-band interrupt request.

DETAILED DESCRIPTION

Figure 1:
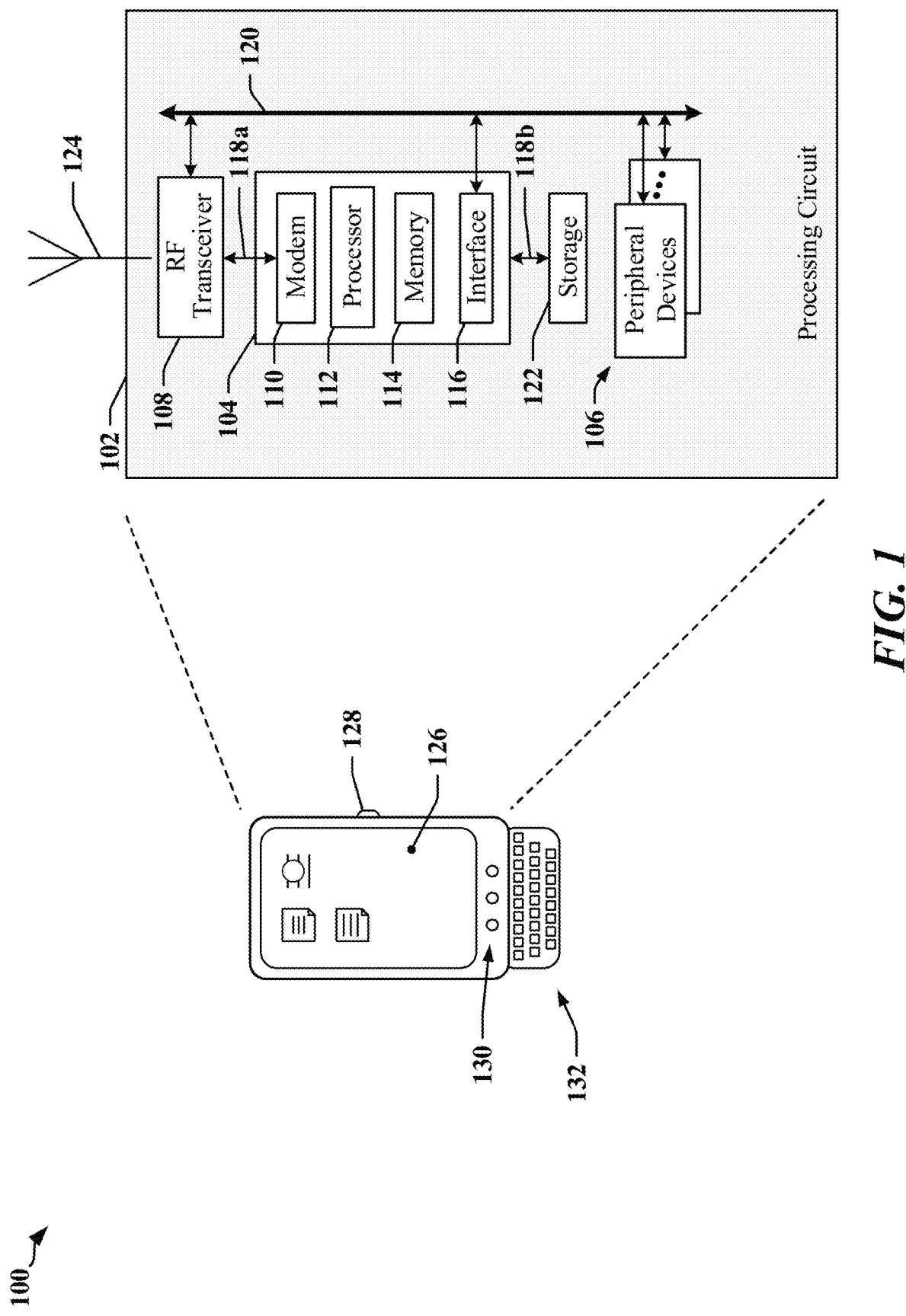
FIG. 1 illustrates an apparatus employing a data link between IC devices that may be adapted in accordance with certain aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects and features will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include application-specific IC (ASIC) devices, SoCs and/or other IC devices often employ a shared communication interface that may include a serial bus or other data communication link to connect processors with modems and other peripherals. The serial bus may be operated in accordance with specifications and protocols defined by a standards body. In certain implementations, the serial bus is operated in accordance with protocols such as I2C and/or I3C protocols, which define timing relationships between signals transmitted over the serial bus. Certain aspects disclosed herein relate to systems, apparatus, methods and techniques that provide an arbitration scheme that can be used on a serial bus to minimize latency for high priority devices, avoid starvation of low-priority slave device, and improve overall link performance.

The conventional IBI procedure defined by I3C protocols processes one interrupt at a time and asserting devices are handled in a sequence defined by priority. The delays in processing low-priority interrupts are compounded by the time required to perform address arbitration after each interrupt is cleared. Certain aspects disclosed herein can reduce the number of arbitration cycles performed when multiple IBIs are asserted. In one aspect, a bus master and multiple slave devices may be adapted or configured such that two or more slave devices concurrently asserting an IBI request may be identified in one arbitration cycle. In one example, slave devices may be assigned uniquely identifiable addresses and caused to participate in the complete arbitration cycle, including when other devices have driven SDA during the arbitration cycle. In the latter example, the bus master can identify multiple slave devices that are requesting interrupt service in a single arbitration cycle and can determine whether a lower-priority slave device is to be serviced after the arbitration cycle According to certain aspects of this disclosure, a method for bus arbitration performed at a slave device includes asserting an in-band interrupt request on a serial bus operated in accordance with an I3C protocol, transmitting a slave address associated with the slave device over a data line of the serial bus during a first bus arbitration transaction conducted after the in-band interrupt request is asserted, ignoring signaling state of the data line while transmitting the slave address, and participating in one or more transactions responsive to assertion of the in-band interrupt request and transmission of the slave address. At least one other slave device transmits an address over the data line during the first bus arbitration transaction.

Example of an Apparatus with a Serial Data Link

According to certain aspects of this disclosure, a serial data link may be employed to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similarly functioning device.

FIG. 1 illustrates an example of an apparatus 100 that employs a data communication bus and that may be adapted to operate in accordance with certain aspects disclosed herein. The apparatus 100 may include a processing circuit 102 having multiple circuits and/or devices 104, 106 and/or 108, which may be implemented in one or more ASICs or in an SoC for example. In one example, the apparatus 100 may be a communication device and the processing circuit 102 includes a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or in other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include non-transitory media, such as read-only memory (ROM), random-access memory (RAM), electrically erasable programmable ROM (EEPROM), flash cards, or other types memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
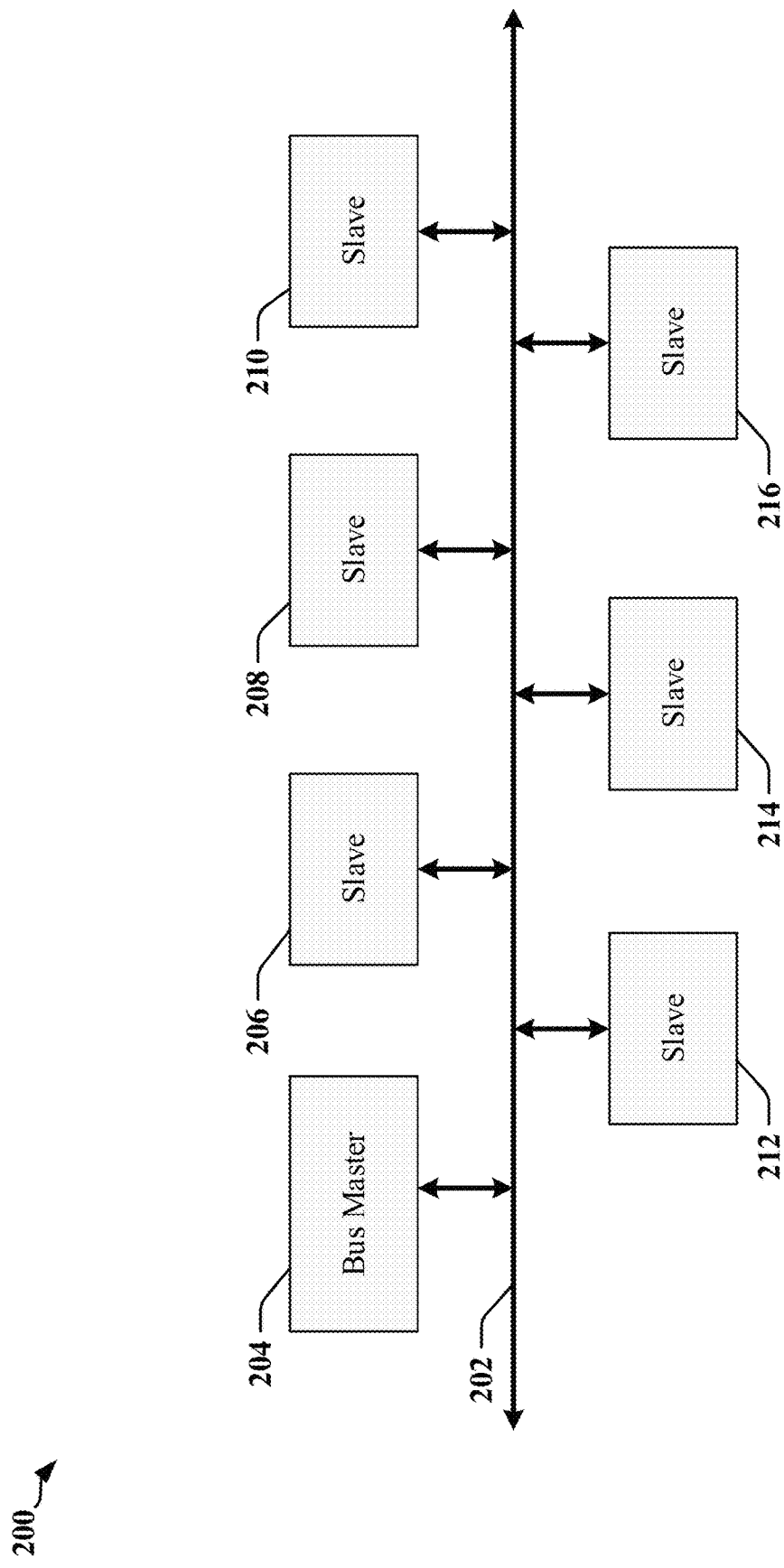
FIG. 2 illustrates a communication interface in which a plurality of devices is connected using a serial bus.

FIG. 2 illustrates a communication link 200 in which multiple devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols that define signaling state of clock and data signals, where timing information is embedded in the transmission of the symbols.

Figure 3:
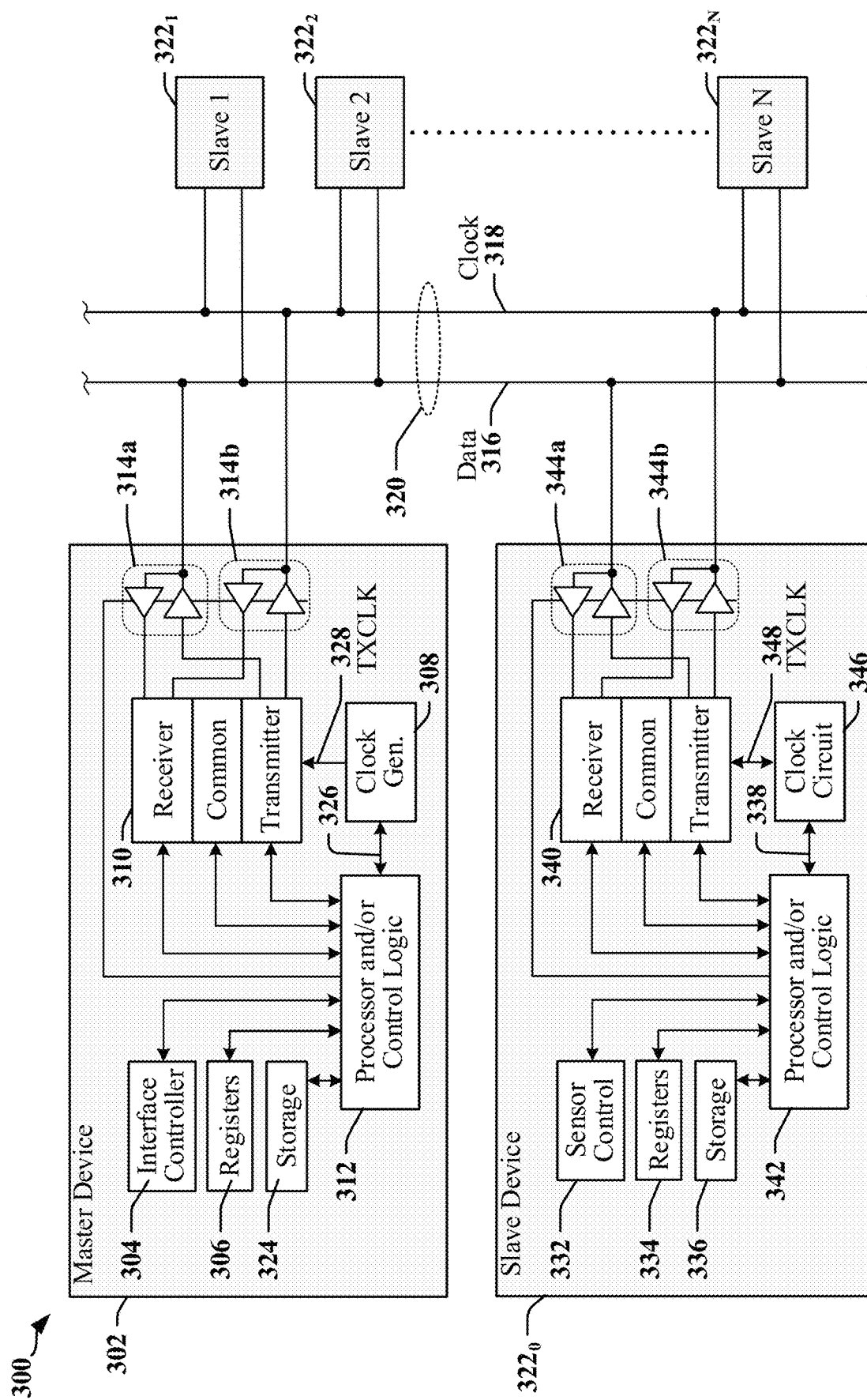
FIG. 3 illustrates certain aspects of an apparatus that includes multiple devices connected to a serial bus.

FIG. 3 illustrates certain aspects of an apparatus 300 that includes multiple devices 302, and $322_0$-$322_N$ coupled to a serial bus 320. The devices 302 and $322_0$-$322_N$ may be provided in one or more semiconductor IC devices, such as an application processor, SoC or ASIC. In various implementations, the devices 302 and $322_0$-$322_N$ can include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communication between devices 302 and $322_0$-$322_N$ over the serial bus 320 is controlled by a bus master device 302. Certain types of bus can support multiple bus master devices 302.

In one example, a bus master device 302 may include an interface controller 304 that manages access to the serial bus 320, configures dynamic addresses for slave devices $322_0$-$322_N$ and/or generates a clock signal 328 to be transmitted on a clock line 318 of the serial bus 320. The bus master device 302 may include configuration registers 306 or other storage 324, and/or control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic circuits and/or storage devices. In one example, the transmitter encodes and transmits data based on timing in the clock signal 328 provided by a clock generation circuit 308. Other timing clock signals 326 may be provided for the use of by the control logic 312 and other functions, circuits or modules. The line drivers/receivers 314a and 314b may be configurable to operate in open-drain and push-pull modes.

At least one device $322_0$-$322_N$ can be configured to operate as a slave device on the serial bus 320 and may include circuits and modules that support a display, an image sensor, and/or circuits and modules that control and communicate with one or more sensors that measure environmental conditions. In one example, a slave device $322_0$ configured to operate as a slave device may provide a control function, module or circuit 332 that includes circuits and modules to support a display, an image sensor, and/or circuits and modules that control and communicate with one or more sensors that measure environmental conditions. The slave device $322_0$ may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic circuits and/or storage devices. In one example, the transmitter encodes and transmits data based on timing in a clock signal 348 provided by clock generation and/or recovery circuits 346. The clock signal 348 may be derived from a signal received from the clock line 318. Other timing clock signals 338 may be provided for the use of the control logic 342 and other functions, circuits or modules. The line drivers/receivers 344a and 344b may be configurable to operate in open-drain and push-pull modes.

The serial bus 320 may be operated in accordance with an I2C, I3C, RFFE, SPMI, SMB or another protocol. At least one device 302, $322_0$-$322_N$ may be configured to operate as a master device and a slave device on the serial bus 320. Two or more devices 302, $322_0$-$322_N$ may be configured to operate as a master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

Data Transfers Over a Serial Bus

Examples of data transfers including control signaling, command and payload transmissions are provided by way of example. The examples illustrated relate to I2C and I3C communication for convenience. However, certain concepts disclosed herein are applicable to other bus configurations and protocols, including RFFE, SPMI, SMB or another protocol or bus configuration. In one example, I3C protocols include an I3C HDR protocol that encodes data in ternary symbols (HDR-TSP), and HDR-TSP timeslots may be defined in terms of HDR-TSP words, where each slot may be expressed as a set of six successive recovered clock pulses, which is the equivalent number of clock pulses for an HDR-TSP word. In another example, I3C protocols include an I3C HDR double data rate (HDR-DDR) protocol, where timeslots may be defined in terms of HDR-DDR words and/or expressed as the number of clock pulses used to transmit an HDR-DDR word. The concepts disclose herein may be applicable to a serial bus operated in accordance with a protocol that supports multiple data lanes.

Figure 4:
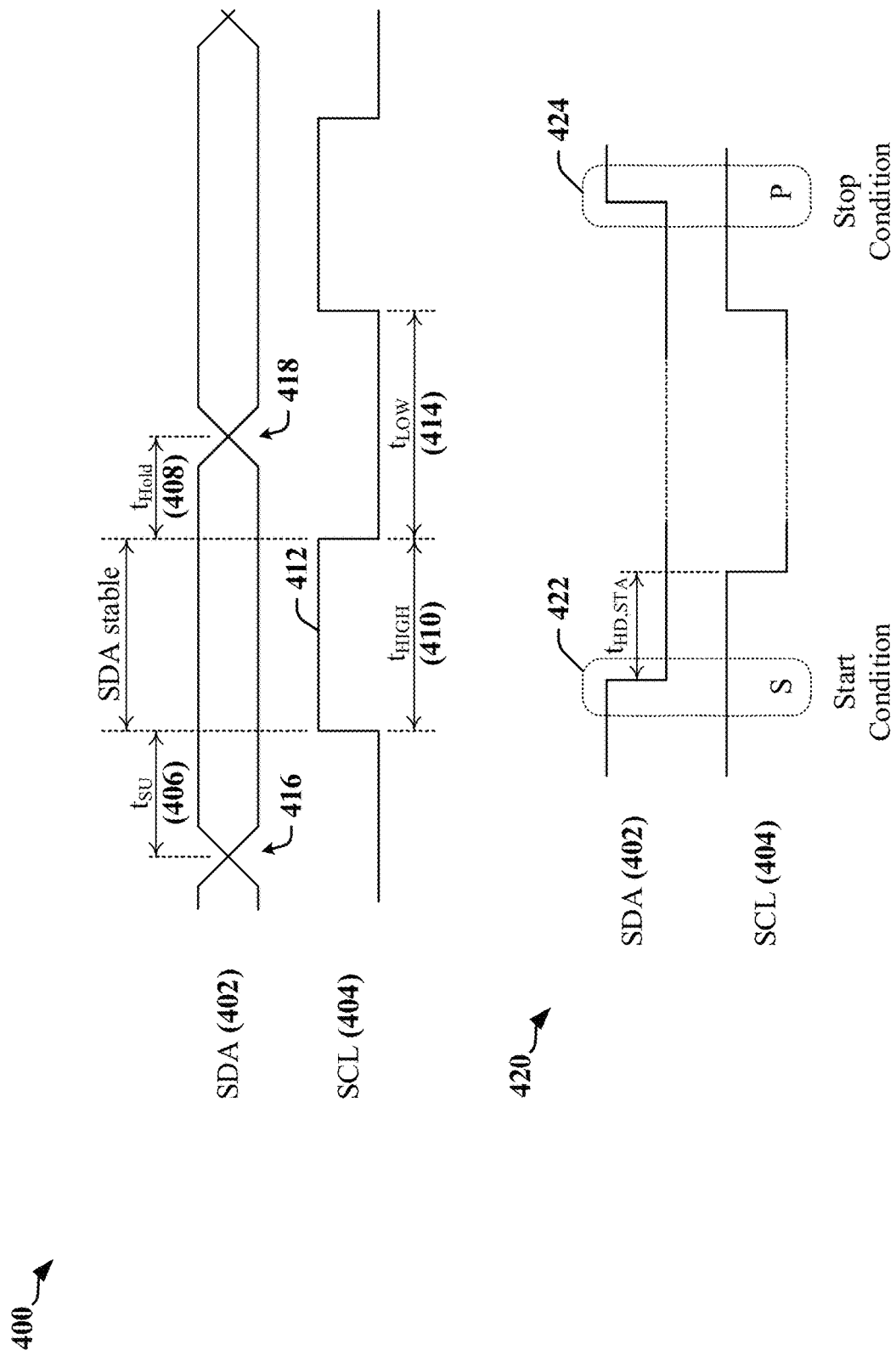
FIG. 4 illustrates certain aspects of the timing relationship between SDA and SCL wires on a conventional I2C bus.

FIG. 4 includes timing diagrams 400 and 420 that illustrate the relationship between the SDA wire 402 and the SCL wire 404 of a serial bus operated in certain I2C and I3C modes. The first timing diagram 400 illustrates the timing relationship between the SDA wire 402 and the SCL wire 404 while data is being transferred on a conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid such that the state of the SDA wire 402 is not permitted to change when the SCL wire 404 is in the high logic state.

In one example, specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{Low}$) for the SCL wire 404. The data on the SDA wire 402 is typically stable and/or can be captured for the duration 410 ($t_{HIGH}$) when the SCL wire 404 is in the high logic state after the leading edge of the pulse 412.

Certain protocols provide for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

The second timing diagram 420 of FIG. 4 illustrates signaling states on the SDA wire 402 and the SCL wire 404 between data transmissions on a serial bus. A start condition 422 is defined to permit the current bus master to signal that data is to be transmitted. The start condition 422 occurs when the SDA wire 402 transitions from high to low while the SCL wire 404 is high. The bus master initially transmits the start condition 422, which may be also be referred to as a start bit, followed by a 7-bit address of an I2C slave device with which it wishes to exchange data. The address is followed by a single bit that indicates whether a read or write operation is to occur. The addressed slave device, if available, responds with an ACK bit. If no slave device responds, the bus master may interpret the high logic state of the SDA wire 402 as a NACK. The master and slave devices may then exchange bytes of information in frames, in which the bytes are serialized such that the most significant bit (MSB) is transmitted first. The transmission of the byte is completed when a stop condition 424 is transmitted by the master device. The stop condition 424 occurs when the SDA wire 402 transitions from low to high while the SCL wire 404 is high.

Figure 5:
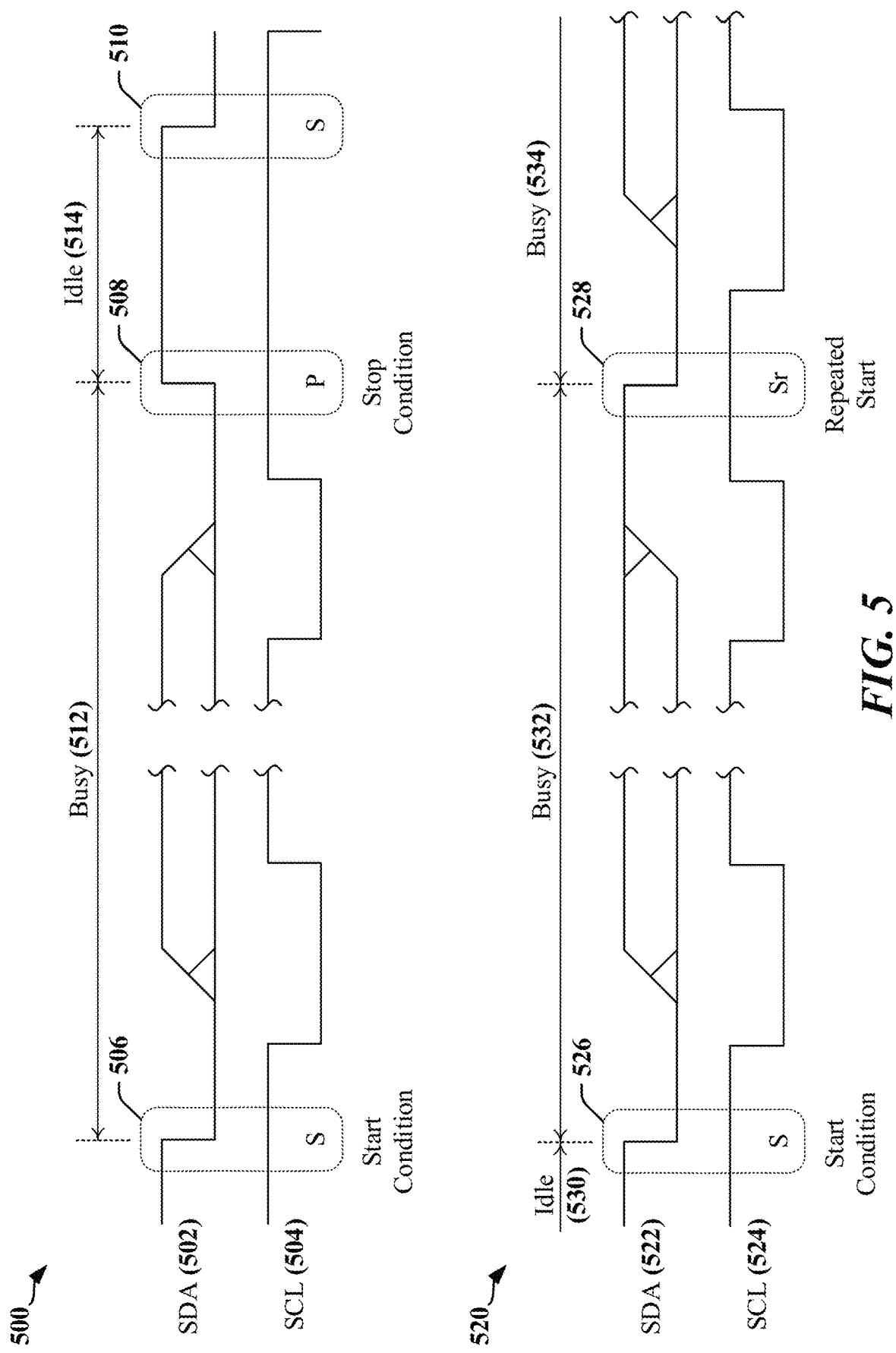
FIG. 5 is a timing diagram that illustrates timing associated with multiple frames transmitted on an I2C bus.

FIG. 5 includes diagrams 500 and 520 that illustrate timing associated with data transmissions on a serial bus operated in accordance with an I2C or I3C protocol. As illustrated in the first diagram 500, an idle period 514 may occur between a stop condition 508 and a consecutive start condition 510. In the illustrated example, the SDA line 502 and SCL line 504 may be held and/or driven to a high voltage state during the idle period 514. This idle period 514 may be prolonged, and may result in reduced data throughput when the serial bus remains idle between the stop condition 508 and the next start condition 510. In operation, a busy period 512 commences when the I2C bus master transmits a first start condition 506, followed by data. The busy period 512 ends when the bus master transmits a stop condition 508 and the idle period 514 ensues. The idle period 514 ends when a second start condition 510 is transmitted.

The second timing diagram 520 illustrates a method by which the number of occurrences of an idle period 514 may be reduced. In the illustrated example, data is available for transmission before a first busy period 532 ends. The bus master device may transmit a repeated start condition 528 (Sr) rather than a stop condition. The repeated start condition 528 terminates the preceding data transmission and simultaneously indicates the commencement of a next data transmission. The state transition on the SDA wire 522 corresponding to the repeated start condition 528 is identical to the state transition on the SDA wire 522 for a start condition 526 that occurs after an idle period 530. For both the start condition 526 and the repeated start condition 528, the SDA wire 522 transitions from high to low while the SCL wire 524 is high. When a repeated start condition 528 is used between data transmissions, a first busy period 532 is immediately followed by a second busy period 534.

Figure 6:
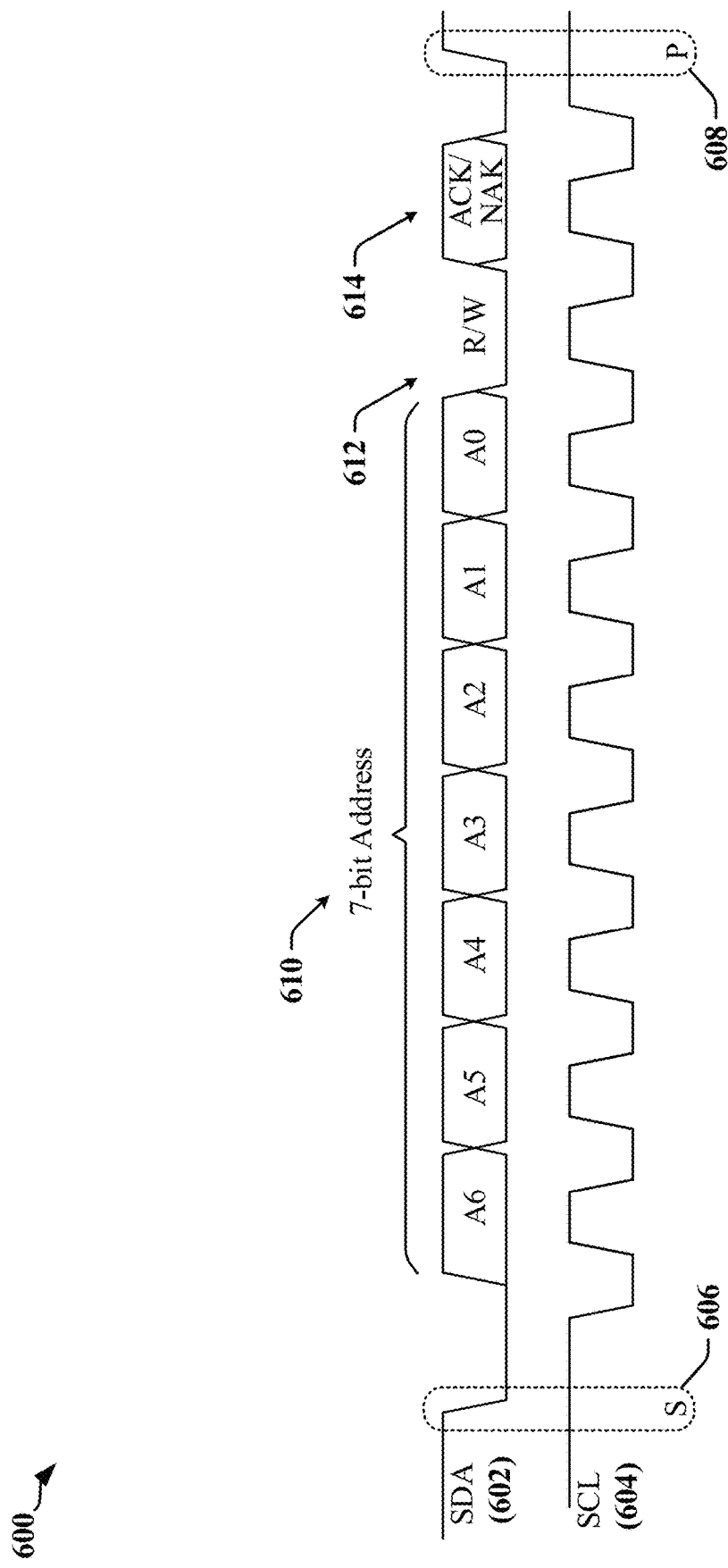
FIG. 6 illustrates timing related to a command word sent to a slave device in accordance with I2C protocols.

FIG. 6 illustrates an example of the timing 600 associated with an address word sent to a slave device in accordance with certain I2C and/or I3C protocols. In the example, a master device initiates the transaction with a start condition 606, whereby the SDA wire 602 is driven from high to low while the SCL wire remains high. The master device then transmits a clock signal on the SCL wire 604. The seven-bit address 610 of a slave device is then transmitted on the SDA wire 602. The seven-bit address 610 is followed by a Write/Read command bit 612, which indicates "Write" when low and "Read" when high. The slave device may respond in the next clock interval 614 with an acknowledgment (ACK) by driving the SDA wire 602 low. If the slave device does not respond, the SDA wire 602 is pulled high and the master device treats the lack of response as a NACK. The master device may terminate the transaction with a stop condition 608 by driving the SDA wire 602 from low to high while the SCL wire 604 is high. This transaction can be used to determine whether a slave device with the transmitted address coupled to the serial bus is in an active state.

Figure 7:
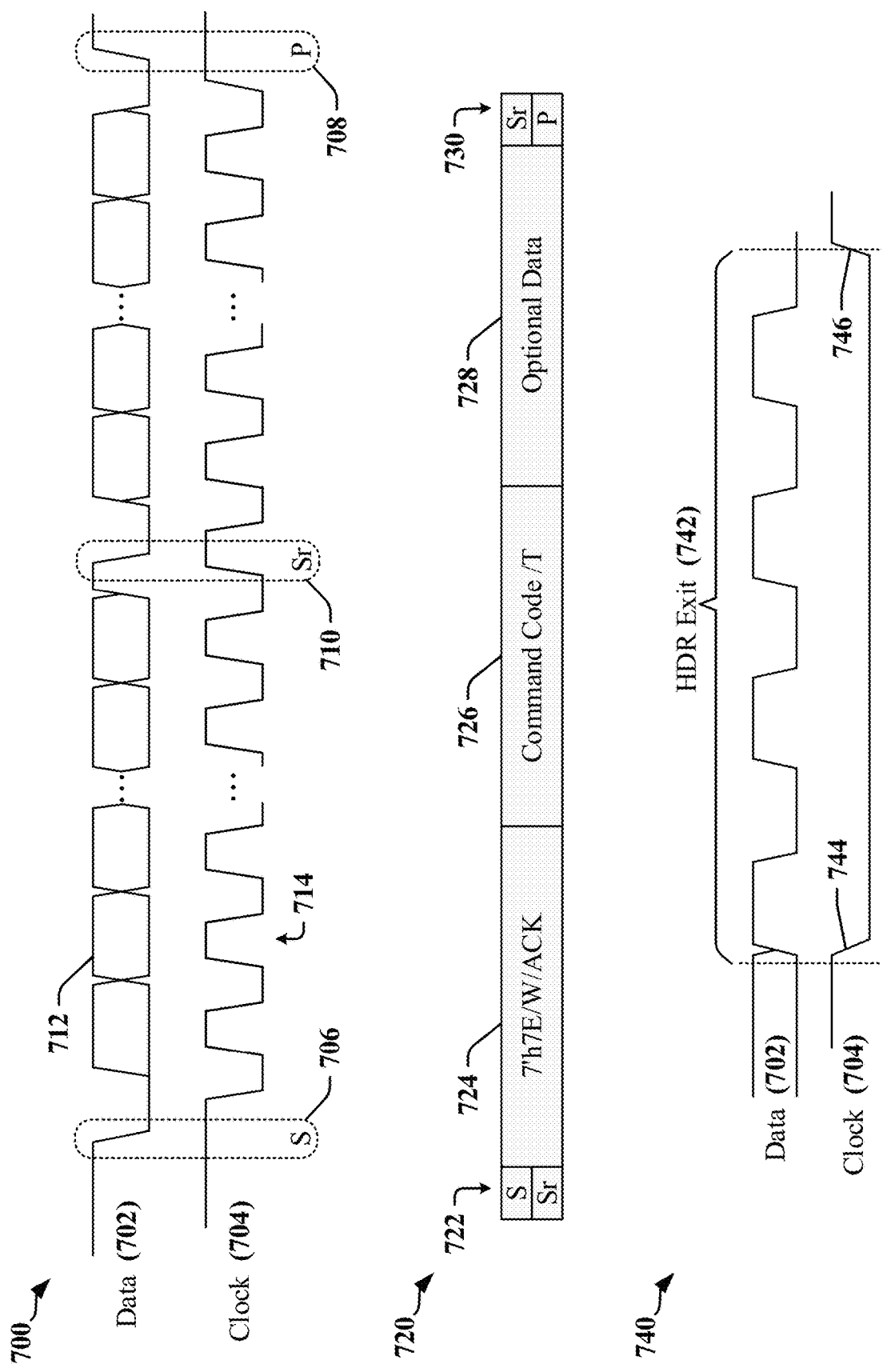
FIG. 7 includes a timing diagram that illustrates an example of signaling on a serial bus when the serial bus is operated in a mode of operation defined by I3C specifications.

FIG. 7 illustrates signaling 700 on a serial bus when the serial bus is operated in a single data rate (SDR) mode of operation defined by I3C specifications. Data transmitted on a first wire of the serial bus, which may be referred to as the Data wire 702, SDA or SDATA, may be captured using a clock signal transmitted on a second wire of the serial bus, which may be referred to as the Clock wire 704, SCL or SCLOCK. During data transmission, the signaling state 712 of the Data wire 702 is expected to remain constant for the duration of the pulses 714 when the Clock wire 704 is at a high voltage level. Transitions on the Data wire 702 when the Clock wire 704 is at the high voltage level indicate a START condition 706, a STOP condition 708 or a Repeated Start 710.

On an I3C serial bus, a START condition 706 is defined to permit the current bus master to signal that data is to be transmitted. The START condition 706 occurs when the Data wire 702 transitions from high to low while the Clock wire 704 is high. The bus master may signal completion and/or termination of a transmission using a STOP condition 708. The STOP condition 708 is indicated when the Data wire 702 transitions from low to high while the Clock wire 704 is high. A Repeated Start 710 may be transmitted by a bus master that wishes to initiate a second transmission upon completion of a first transmission. The Repeated Start 710 is transmitted instead of a STOP condition 708, and has the significance of a STOP condition 708 followed immediately by a START condition 706. The Repeated Start 710 occurs when the Data wire 702 transitions from high to low while the Clock wire 704 is high.

The bus master may transmit an initiator 722 that may be a START condition 706 or a Repeated Start 710 prior to transmitting an address of a slave, a command, and/or data. FIG. 7 illustrates a command code transmission 720 by the bus master. The initiator 722 may be followed in transmission by a predefined address header 724 and a command code 726. The command code 726 may, for example, cause the serial bus to transition to a desired mode of operation. In some instances, data 728 may be transmitted. The command code transmission 720 may be followed by a terminator 730 that may be a STOP condition 708 or a Repeated Start 710.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal.

An I3C bus may be switched between SDR and DDR modes. FIG. 7 includes an example of signaling 740 transmitted on the Data wire 702 and the Clock wire 704 to initiate certain mode changes. The signaling 740 is defined by I3C protocols for use in initiating restart, exit and/or break from I3C HDR modes of communication. The signaling 740 includes an HDR Exit 742 that may be used to cause an HDR break or exit. The HDR Exit 742 commences with a falling edge 744 on the Clock wire 704 and ends with a rising edge 746 on the Clock wire 704. While the Clock wire 704 is in a low signaling state, four pulses are transmitted on the Data wire 702. I2C devices ignore the Data wire 702 when no pulses are provided on the Clock wire 704.

Interrupts and Address Arbitration on a Serial Bus

Certain serial bus protocols provide an interrupt capability that enables slave devices to gain access to the serial bus in order to transmit high-priority and/or low-latency messages. I2C, I3C, RFFE and SPMI protocols define an in-band interrupt that may be implemented using combinations of signaling on the clock and data wires of the serial bus. Other protocols provide an out-of-band interrupt capability. For example, the SMB protocol defines an optional interrupt signal wire that connects a slave device to the SMBALERT# input of a master device and permits the SMB slave device to assert a side-band interrupt to indicate that it has one or more messages to be transmitted to the master device. Address arbitration can be used to identify slave devices that asserted an interrupt through the in-band or side-band signaling defined by the protocol that controls bus operation when multiple slave devices are able or expected to concurrently assert interrupts. Arbitration schemes defined by SMB protocols may correspond to arbitration schemes defined by I2C, I3C, RFFE and SPMI protocols. The example of in-band interrupts defined by I3C protocols is used in various descriptions herein, including in relation to certain aspects of presently-disclosed address arbitration processes. It is anticipated that the I3C protocol example can serve as a proxy for other protocols.

Figure 8:
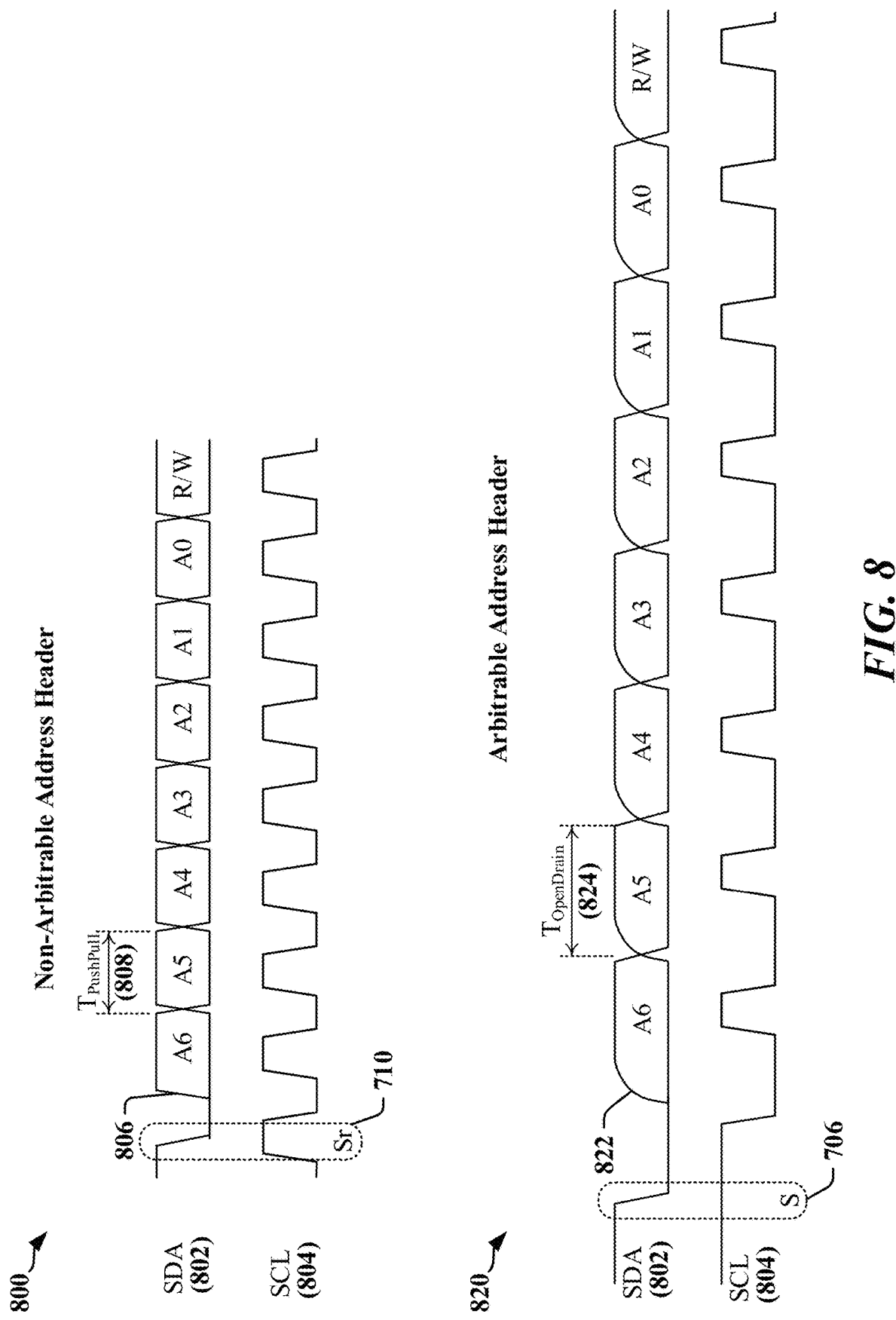
FIG. 8 illustrates a non-arbitrable address header and an arbitrable address header that may be transmitted on a serial bus operated in accordance with I3C protocols.

In the example of a serial bus operated in accordance with an I3C protocol, one or more devices other than the current bus master may assert an in-band interrupt during transmission of certain address fields. An address arbitration process may be initiated to enable one of the asserting devices to gain access to the serial bus. The serial bus may be operated in a mode in which data is transmitted on a data line in accordance with timing provided by a clock signal transmitted on a clock line when the in-band interrupt is asserted. FIG. 8 illustrates a non-arbitrable address header 800 and an arbitrable address header 820 that may be transmitted on the SDA line 802 of the serial bus in accordance with I3C protocols. I3C arbitrable address headers 820 are transmitted after a START condition 706. An address header 724 transmitted after a Repeated Start 710 is not arbitrable. A device may use an I3C arbitrable address header to assert an In-Band Interrupt, make a secondary master request, or indicate a hot-join request.

A non-arbitrable address header 800 is transmitted using push-pull drivers, while open-drain drivers are enabled during transmission of an arbitrable address header 820. Rising edges 806 in a non-arbitrable address header 800 are actively driven by a push-pull driver and enable a shorter bit interval 808 than the bit interval 824 available during an open-drain transmission, due to the slow rise time of the pulled-up edges 822 in an arbitrable address header 820. In FIG. 8, the bit intervals 808, 824 are not depicted on a common scale.

A clock signal transmitted on the SCL line 804 provides timing information that is used by a slave device to control transmission of bits on the SDA line 802, where the clock signal may be used by a receiving device for sampling and/or capturing bits of data transmitted on the SDA line 802. A bus master device may read one or more registers on a slave device or secondary master device that wins arbitration. In conventional systems, the bus master device may provide clock pulses in a clock signal that have a period sufficient to successfully read the slowest possible device coupled to the serial bus. Each slave device has different operating characteristics and limitations that affect the response time of the slave device. In one example, the response time of a slave device may be affected by the physical distance between the slave device and the bus master device. In another example, the response time of a slave device may be affected by the processing capabilities of the slave device, where a slower controller, state machine or other processor in the slave device may delay responses transmitted by the slave device during in-band interrupt handling and/or processing.

A primary master device, which may be referred to as a bus owner master or BoM, manages an initial dynamic address assignment procedure. The BoM initiates the dynamic address assignment procedure by command transmitted to enable each active slave device to identify itself with an address that is based on a provisional ID in order to obtain an assigned dynamic address. Each slave device uses its assigned dynamic address for subsequent transactions on the I3C Bus. The assigned dynamic addresses define a priority structure for the slave devices coupled to the serial bus. The priority level of each slave device is encoded in its dynamic address, such that the highest priority device among slave devices has the lowest dynamic address and the lowest priority device among slave devices has the highest dynamic address. Priority level defines the order in which in-band interrupts and other requests are processed by a bus master.

Various protocols operable on a serial bus cause a bus master to assign dynamic addresses that are 7 bits in length. Conventional I3C protocols specify that a bus master may assign dynamic addresses within the range {0x03 to 0x7B}. Address reservations may be undefined or differently defined by other bus protocols. Nominally, a bus master device conducts arbitration procedures in open-drain mode to permit transmission of all potential address bits. The bus master initiates an arbitrable address header 820 to provide opportunities for requests for dynamic address allocation, hot-join and transfer of designation of bus master, for example.

On a multidrop serial bus, one or more slave devices may request service and/or control of the multidrop serial bus by asserting an in-band interrupt and participating in an arbitration procedure. A slave device may request termination of a transaction by asserting an in-band interrupt when, for example, high-priority or low-latency data becomes available for transfer from the slave device to the master device. In some implementations, multiple devices coupled to a point-to-point link may be operable as the bus master and the current slave device may request transfer of control of the point-to-point link by asserting an in-band interrupt.

Figure 9:
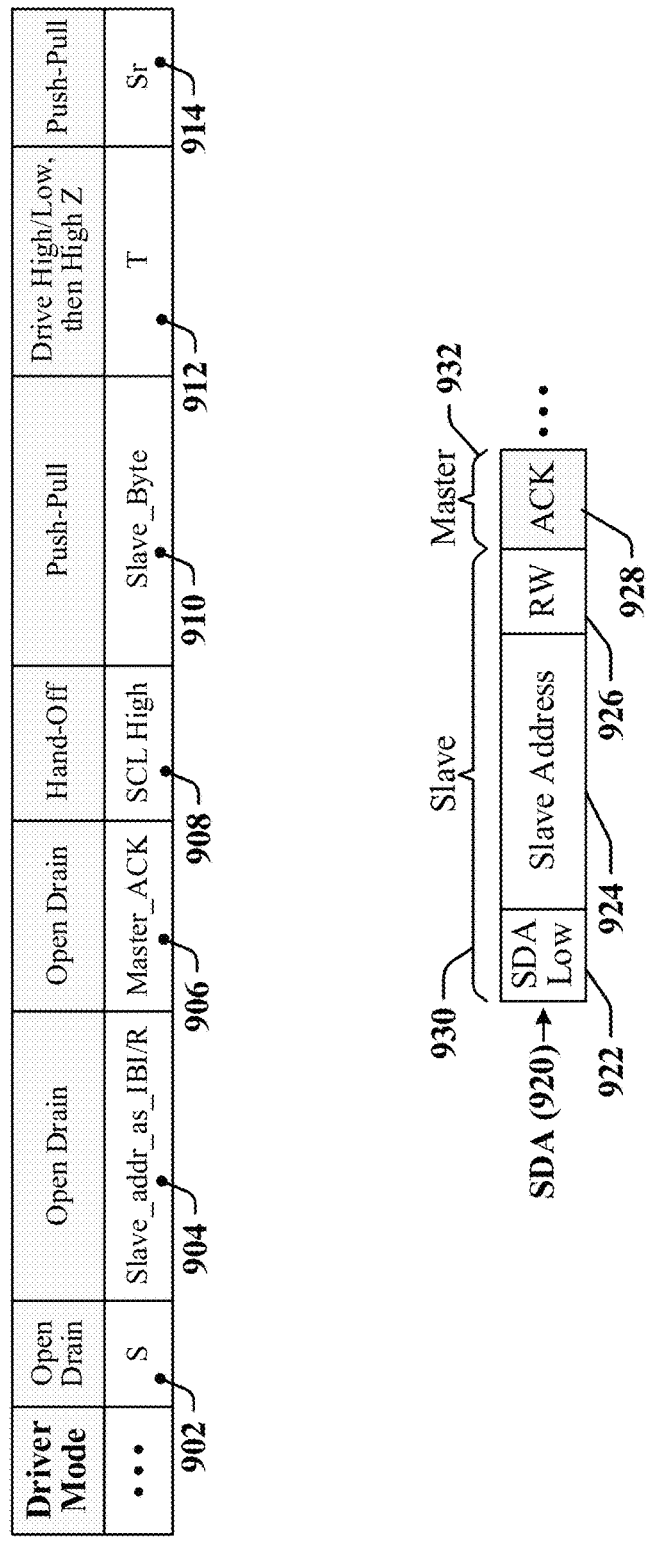
FIG. 9 illustrates certain aspects of a basic I3C IBI process.

FIG. 9 illustrates timing 900 of a basic I3C IBI process. In the basic I3C IBI process, a device other than the current bus master may assert an in-band interrupt during transmission of certain address fields to initiate an arbitration procedure that enables the asserting device to request access to, and/or to gain control of a serial bus. The serial bus may be operated in a mode in which an arbitrable address header 904 is transmitted on a data line in accordance with timing provided by a clock signal transmitted on a clock line. The arbitrable address header 904 is transmitted after a START condition 902 and is transmitted when the serial bus is operated in an open-drain mode. A slave device may assert an in-band interrupt by driving its address on SDA. The master device recognizes the in-band interrupt when it detects that SDA has been driven low by another device during one or more bit transmission intervals. The slave device with the lowest address wins the arbitration procedure and I3C protocols provide that other slave devices are to withdraw from the arbitration procedure after detecting that SDA has been driven low by another device.

The master device acknowledges the in-band interrupt by providing an acknowledgement 906 while the bus is in open-drain mode. The master device may initiate an in-band interrupt service procedure to determine the nature of the service requested by the slave device. In one example, the master device may disable its line driver coupled to SDA during a hand-off period 908 when the clock signal is held in a high logic state. The slave device enables push-pull mode for its line driver coupled to SDA during the hand-off period 908 and transmits a data byte 910 that is followed by a transition bit (T-bit 912). The master device may determine the nature of the in-band interrupt request based on configuration information read from the slave device, content of the data byte 910 and/or from other configuration information. The T-bit 912 is provided when the slave device drives SDA high or low before causing the output of its line driver to enter a high-impedance state. The current master device may then provide a repeated START 914.

FIG. 9 also illustrates certain activities on SDA 920 during an I3C IBI process. In one aspect, an asserting slave device may drive SDA 920 during a first period 930 and the master device may drive SDA 920 during a second period 932. In the illustrated example, the slave device may initiate a START condition by driving SDA 920 in the first period 930. The slave device may participate in the arbitration procedure by attempting to provide its address in the address field 924. When a slave device determines that its address was successfully transmitted in the address field 924, the slave device may drive SDA 920 in a bit interval 926 to indicate a request for a read or write transaction. The bus master then provides an ACK 928 during the second period 932 to indicate that the winning slave device is too be serviced.

Conventional I3C protocols enable the master device to identify the highest-priority slave device asserting an IBI request. When multiple devices are concurrently requesting access to the bus, the bus master typically services each asserting device in an order of device priority determined by the arbitration procedure. Device service typically includes executing one or more transactions. The performance of multiple arbitration procedures to identify and service all of the slave devices that concurrently assert and IBI request can increase bus latency and can negatively impact bus performance.

Figure 10:
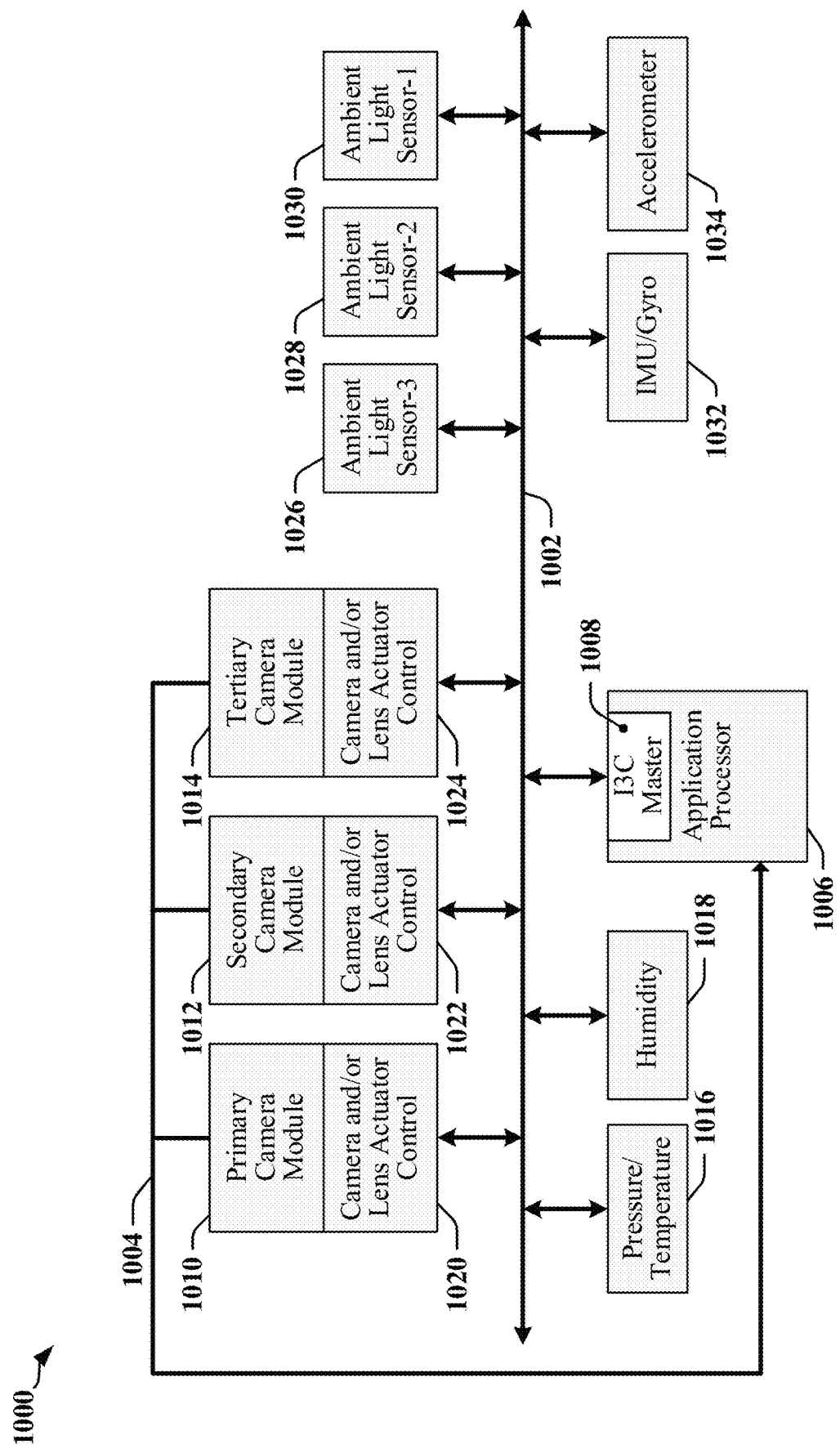
FIG. 10 illustrates a system that may be deployed in a device that implements or supports devices that may generate multiple concurrent interrupts.

Performance and latency issues can inhibit the operation of various systems and devices. For example, communication links in devices involved in multimedia, robotics and other applications may experience ever-increasing demands for throughput and responsiveness, including increased demands arising from greater complexity and/or greater numbers of sensors, actuators and user interface devices. FIG. 10 illustrates a system 1000 that may be deployed in a device that implements or supports one or more robotics, multimedia, virtual or augmented reality, communication or other application. In some examples, the system 1000 that may be provided in a mobile communication device, a mobile computing device, a drone, a mobile robotic device, or the like.

In the illustrated system 1000, a serial bus 1002 couples multiple devices including an application processor 1006, camera control modules 1020, 1022, 1024 and multiple sensors 1016, 1018, 1026, 1028, 1030, 1032, 1034. The system 1000 and/or its constituent devices may be implemented using one or more semiconductor IC devices, such as an SoC or ASIC. The system 1000 may include other devices coupled to the serial bus 1002 including, for example, a modem, a signal processing device, a display driver, a user interface, a transceiver, and/or other such components or devices. The serial bus 1002 may be operated in accordance with an I2C, I3C, RFFE, SPMI, SMB and/or another protocol. Communication over the serial bus 1002 is controlled by a bus master device, and certain protocols can support multiple bus master devices that can take turn in managing bus operations.

For the purposes of this disclosure, the serial bus 1002 will be assumed to be operated in accordance with I3C protocols, with the application processor 1006 serving as the bus master device. In some applications, the serial bus 1002 may be operated in accordance with one or more protocols and/or a device other than the application processor 1006 may serve as the bus master device.

In the illustrated example, the application processor 1006 includes an interface controller 1008 configured to operate as a bus master and to manage access to the serial bus 1002, and to provide a clock signal to be transmitted on a clock line of the serial bus 1002. The application processor 1006 may configure dynamic addresses for slave devices including the camera control modules 1020, 1022, 1024 and sensors 1016, 1018, 1026, 1028, 1030, 1032, 1034. The application processor 1006 may include one or more processing circuits, microprocessors, signal processors, controllers, state machines, sequencers and/or combinational logic.

The camera control modules 1020, 1022, 1024 and sensors 1016, 1018, 1026, 1028, 1030, 1032, 1034 may be configured to operate as slave devices on the serial bus 1002 and may include circuits and modules that support respective functions including, for example, information display, image sensing, environmental condition measurement. The camera control modules 1020, 1022, 1024 and sensors 1016, 1018, 1026, 1028, 1030, 1032, 1034 may include one or more processing circuits, microprocessors, signal processors, controllers, state machines, sequencers and/or combinational logic.

Each of the camera control modules 1020, 1022, 1024 may be configured to manage operation of an imaging device. In certain examples, the camera control modules 1020, 1022, 1024 may configure lens actuators that control focus, zoom, shutter speed and/or frame rate of a camera or imaging device. Each camera control module 1020, 1022, 1024 includes a bus interface circuit that is coupled to the serial bus 1002. Each camera control module 1020, 1022, 1024 includes or is coupled to a camera module 1010, 1012, 1014 that captures image data. The image data may be communicated over one or more high-speed data communication links 1004 that couples the camera modules 1010, 1012, 1014 to the application processor 1006, an image processor, or another processing device.

The illustrated system 1000 includes ambient light sensors 1026, 1028, 1030, each of which may be associated with one of the camera modules 1010, 1012, 1014. The illustrated system 1000 also includes environmental sensors 1016, 1018 that can measure ambient or system environmental conditions such as pressure, temperature, humidity, etc. The illustrated system 1000 also includes motion sensors 1032, 1034 such as an inertial measurement unit (IMU), a gyroscope, an accelerometer, GPS unit or the like.

In various modes of operation of the system 1000, the camera control modules 1020, 1022, 1024 and sensors 1016, 1018, 1026, 1028, 1030, 1032, 1034 may request interrupt service frequently, and multiple devices may assert an IBI request simultaneously or concurrently in order to alert or notify the application processor 1006 of events and/or changes in physical conditions that can affect operation of the system 1000. Different events often have different significances, and notification and response to different types and/or sources of events may be prioritized based on application requirements or preferences. In the illustrated system 1000, a hierarchical system may define system priorities for the camera control modules 1020, 1022, 1024 and sensors 1016, 1018, 1026, 1028, 1030, 1032, 1034. The resultant hierarchical system that can result in a lower-priority slave device to be starved of service when multiple higher-priority devices request servicing concurrently with the lower-priority slave device. The application processor 1006 may respond suboptimally when information available at lower-priority slave devices in not taken into account due to arbitration losses.

Very high priority slave devices may be expected to interrupt with great frequency in some implementations, thereby starving other, lower-priority devices of the attention of the bus master. In one example, motion sensors 1032, 1034 may generate frequent or high-priority interrupts when certain movements across a threshold in one or more axes are detected. Environmental sensors 1016, 1018 may be assigned lower priorities, including when pressure and temperature are expected to change slowly. The conventional IBI procedure defined by I3C protocols processes one interrupt at a time and asserting devices are handled in a sequence defined by address priority. The delays in processing low-priority interrupts are compounded by the time required to perform address arbitration after each interrupt is cleared.

Certain aspects disclosed herein can reduce the number of arbitration cycles performed when multiple IBIs are asserted. In one aspect, a bus master and multiple slave devices may be adapted or configured such that two or more slave devices concurrently asserting an IBI request may be identified in one arbitration cycle. In one example, slave devices may be assigned uniquely identifiable addresses and may be caused to participate in the complete arbitration cycle, including when other devices have driven SDA during the arbitration cycle. In accordance with certain aspects of this disclosure, the bus master can identify multiple slave devices that are requesting interrupt service in a single arbitration cycle, and can determine whether a lower-priority slave device is to be serviced after the arbitration cycle.

Reducing Address Arbitration Cycles

In accordance with certain aspects of this disclosure, lower-priority slave devices may register or identify themselves as requestors of interrupt service in the same arbitration transaction that a higher-priority slave device is requesting interrupt service. The bus master may determine an order of service when multiple slave devices have requested interrupt service in the same arbitration transaction. For example, the bus master may ignore or partially ignore device priority defined by the dynamic addresses assigned to the requesting slave devices. In some instances, the bus master may service the requesting slave devices in a sequence consistent with the device priority defined by the dynamic addresses assigned to the requesting slave devices.

Figure 11:
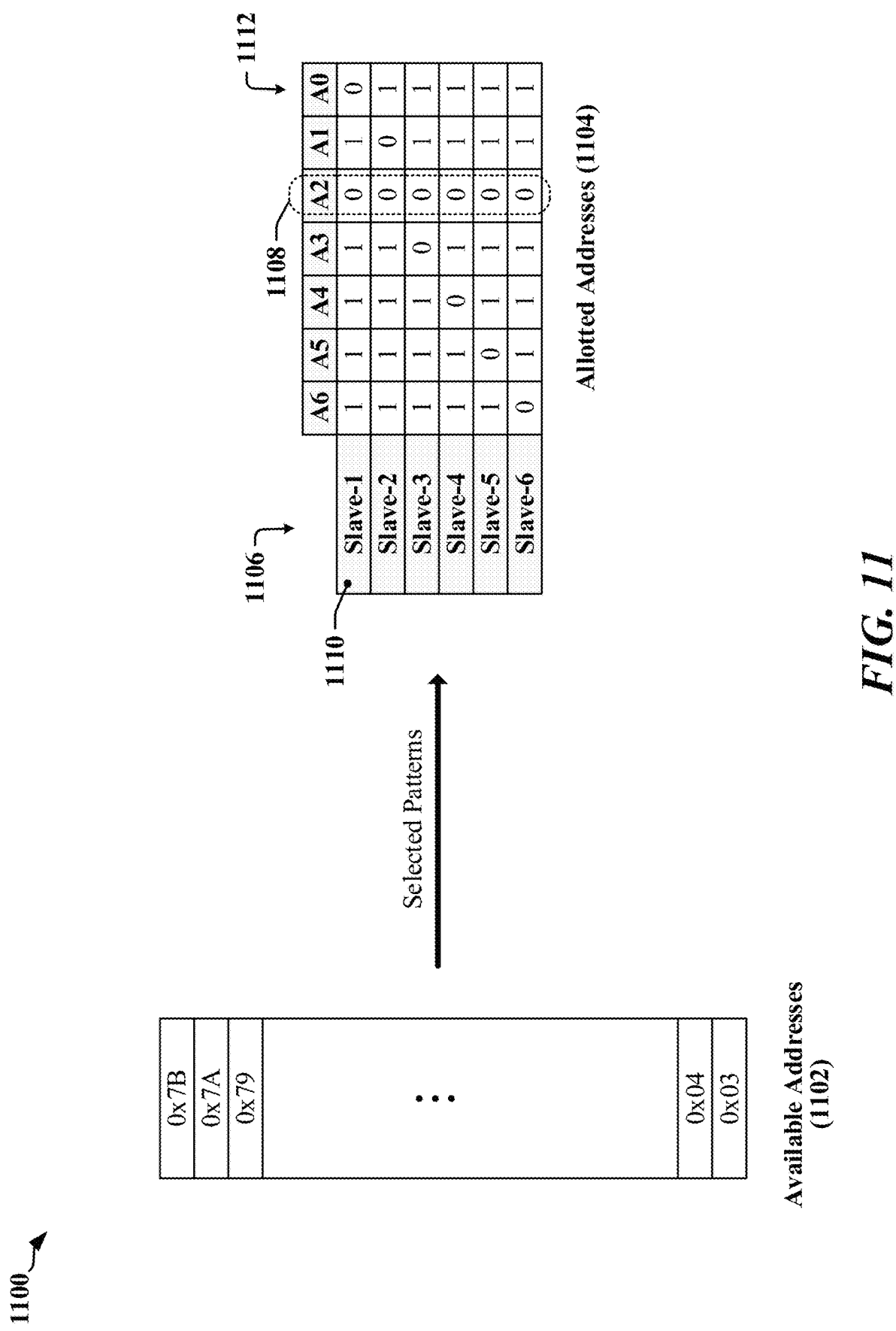
FIG. 11 illustrates an example of an addressing scheme provided in accordance with certain aspects disclosed herein.

FIG. 11 illustrates an example of an addressing scheme 1100 in accordance with certain aspects disclosed herein. The addressing scheme 1100 may be used to enable multiple slave devices to receive interrupt service following a single arbitration transaction. The addressing scheme 1100 can reduce the number of arbitration cycles in which a slave device participates when multiple slave devices have concurrently asserted an IBI request.

In the illustrated addressing scheme 1100, unique addresses are allotted to the slave devices 1106, and the slave devices 1106 are configured to continue participation in an address arbitration cycle regardless of address priority considerations. In the illustrated example, six slave devices 1106 are assigned one of the allotted addresses 1104 from the available addresses 1102 provided by I3C protocols. The A2 bit 1108 in each of the 6 allotted addresses 1104 is set to zero and each of the 6 allotted addresses 1104 includes one other zero-value bit that is different from the zero-value bits in the other addresses. For example, Slave-1 1110 has its A0 bit 1112 set to zero and all other slave devices 1106 have non-zero A0 bits 1112. The addressing scheme 1100 permits the bus master to identify each slave device 1106 based on the bit settings of a composite address in a combined slave response. The composite address includes zero-value bits, each of which are uniquely attributable to the slave devices 1106 involved in the combined slave response, and the correspondence of certain zero-value individual bits in the composite address and/or in the combined slave response with bits in the allotted addresses 1104 enable the bus master to identify slave devices 1106 that are requesting interrupt service.

In other examples, other protocols such as RFFE, SPMI and SMB protocols have fewer or no limits defined for available address, allowing for allocating addresses from a greater range of available addresses. For example, some implementations employing protocols other than certain conventional I3C protocols are not restricted to operations in which the A2 bit in each of the allotted addresses is set to zero, thereby providing 7 addresses that can be assigned to slave devices in accordance with certain aspects of this disclosure.

A slave configured according to certain aspects of this disclosure can be configured to provide its address on the serial bus regardless of whether a higher priority address is being concurrently provided on the serial bus. For example, a lower-priority device operating in accordance with certain aspects of this disclosure may ignore changes in signaling state of SDA caused by a higher-priority slave device that is concurrently requesting service, and the lower-priority device may drive SDA when providing one or more bits of its dynamic address during address arbitration. The addressing scheme 1100 permits the bus master to identify any of the adapted slave devices that are requesting interrupt service in a single arbitration cycle. In some instances, the master device may determine an order in which slave devices are to be serviced that is different from the order indicated by the priority defined by dynamic addresses of the slave devices. The bus master may transmit a NACK after an arbitration transaction in which multiple slaves indicate a request for interrupt service, where the NACK enables the bus master to service the slave devices requesting interrupt service.

According to I3C protocols, the NACK transmitted after the arbitration transaction is interpreted as a refusal of the IBI by the bus master. I3C protocols further provide that a slave device can reassert an IBI after the next START condition or when the bus is available or idle. A bus master adapted in accordance with certain aspects of this disclosure may transmit a repeated START condition after the NACK, which may precede one or more transactions in which the bus master services the slave devices that participated in the address arbitration. An arbitrable header is not provided after a repeated START condition, allowing the bus master to service the slave devices in a sequence that need not conform to the address priority scheme defined by serial bus protocol. When servicing the slave devices, the bus master may clear the source of the interrupts.

In some implementations, the bus master may configure the slave devices such that multiple devices can indicate a request for interrupt service in a single arbitration cycle. In one example, the bus master may write a configuration register in two or more slave devices that define a mode of IBI arbitration. In some instances, the bus master sets a bit that selects between conventional IBI mode and a mode in which the slave device masks off the state of SDA during a following arbitration transaction, thereby ignoring the transmission of higher-priority addresses during the arbitration transaction. The bus master may configure IBI arbitration mode by broadcast command and/or by directly writing multiple slave devices.

Figure 12:
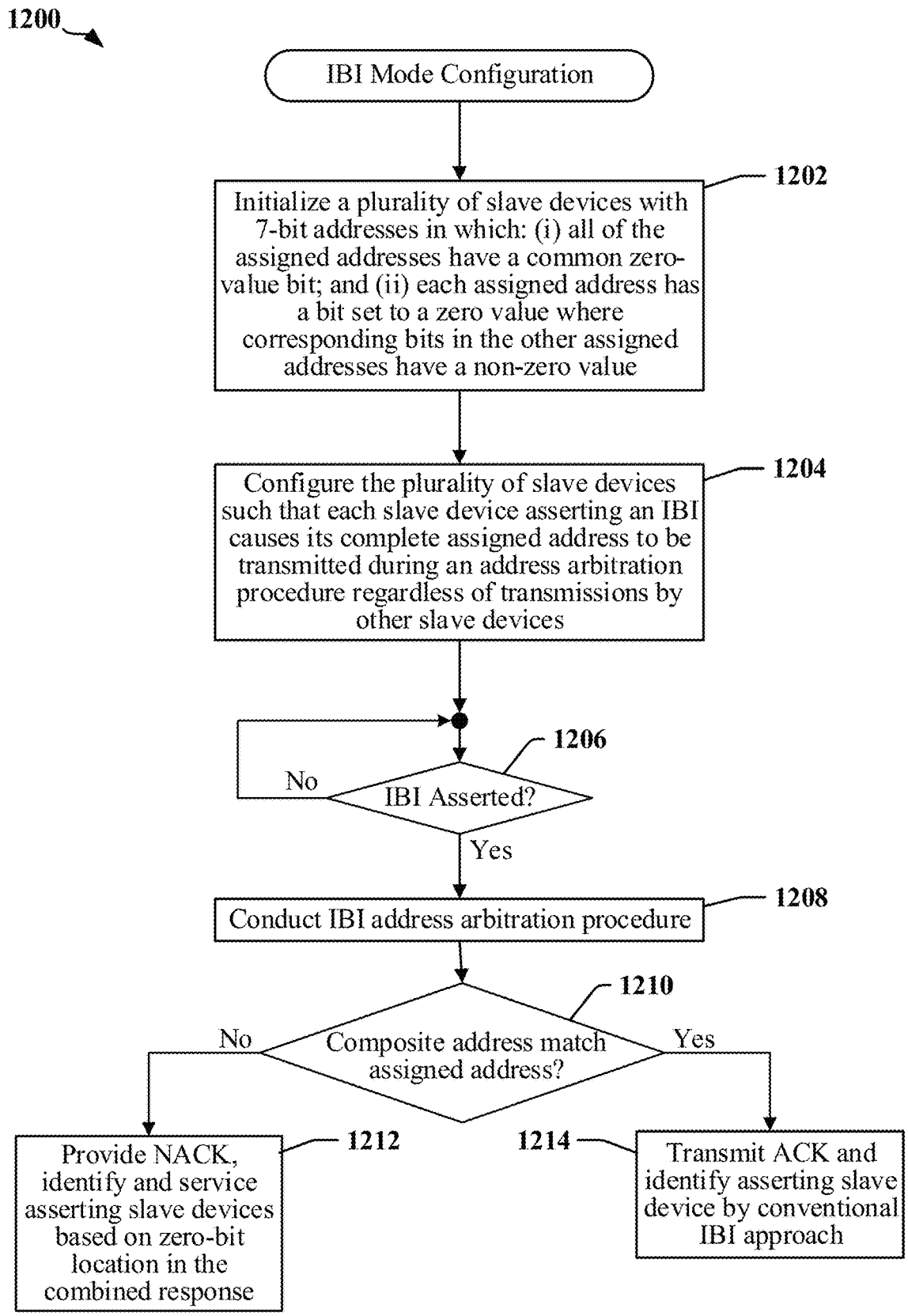
FIG. 12 illustrates configuration of IBI modes in accordance with certain aspects disclosed herein.

FIG. 12 is a flowchart 1200 illustrating configuration of IBI modes in accordance with certain aspects disclosed herein. At block 1202, the bus master may initialize two or more slave devices with 7-bit addresses in which all of the assigned addresses have a common zero-value bit and each assigned address has a bit set to a zero value where corresponding bits in the other assigned addresses have a non-zero value. At block 1204, the bus master may configure the two or more slave devices such that each slave device asserting an IBI causes its complete assigned address to be transmitted during an address arbitration procedure regardless of transmissions by other slave devices. The bus master may wait at block 1206 until an 1131 is asserted.

At block 1208, the bus master may respond to an IBI by conducting an address arbitration procedure. When multiple slave devices participate in the address arbitration procedure by transmitting their respective dynamic addresses, multiple address bits in the composite address obtained from the combined slave response are set to zero, including two or more address bits uniquely identified with participating slave devices. At block 1210, the bus master may determine whether the sampled composite address matches any allotted address maintained in a table or listing by the bus master. For example, the bus master may determine if the composite address matches one of the allotted addresses 1104 of 11. When the sampled composite address does not match any allotted address, then the bus master may determine that multiple slave devices are seeking interrupt service and, at block 1212, the bus master provides a NACK, and proceeds to identify and service asserting slave devices based on zero-bit locations the combined slave response. When the sampled composite address matches an allotted address, then the bus master may determine that a single slave device is seeking interrupt service and, at block 1214, the bus master provides an ACK and identifies the asserting slave device using conventional 1131 procedures defined by protocols governing bus operation.

Figure 13:
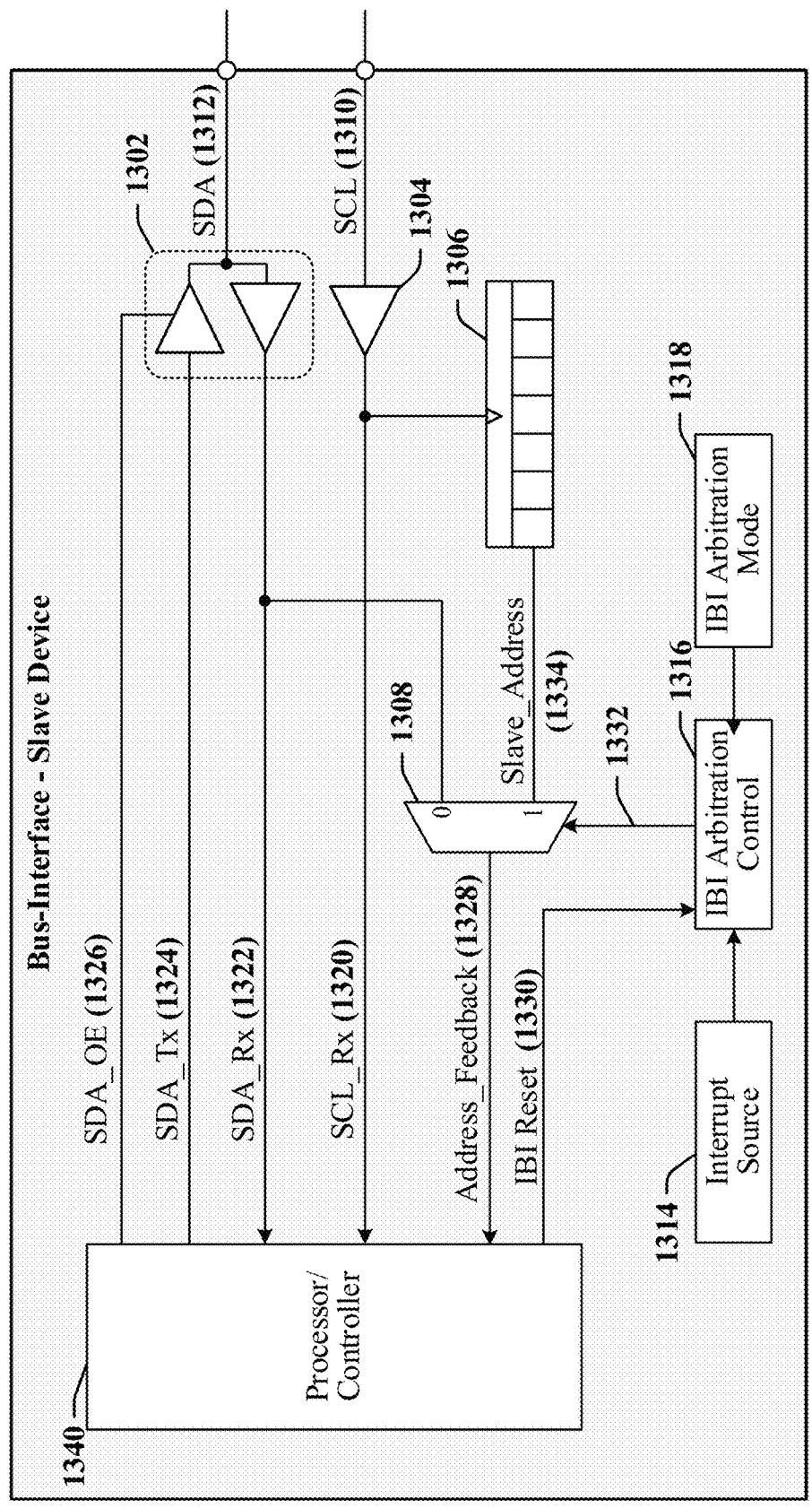
FIG. 13 illustrates an example of a bus interface in a slave device that may be operated in accordance with certain aspects of this disclosure.

FIG. 13 illustrates an example of a bus interface 1300 in a slave device that may be operated in accordance with certain aspects of this disclosure. The illustrated bus interface 1300 includes a clock signal receiver circuit 1304 that couples the slave device to the SCL line 1310 of a serial bus and provides an SCL_Rx signal 1320 representative of the signaling state of the SCL line 1310. In some instances, the slave device may be operable as a bus master and may have a line driver coupled to the SCL line 1310 in order to drive a clock signal on the serial bus. In some implementations, the serial bus may be operated in accordance with an HDR-TSP mode, and the slave device may have a line driver coupled to the SCL line 1310 in order to drive data signals on two lines of the serial bus. The bus interface 1300 includes a transceiver 1302 that couples the slave device to the SDA line 1312. The transceiver 1302 may be controlled by a signal (SDA_OE 1326) that enables or disables a line driver of the transceiver. SDA_OE 1326 may cause the line driver to operate in a push-pull mode, an open-drain mode, a high-impedance (disabled) mode, or another mode. The transceiver 1302 includes a receiver circuit that provides an SDA_Rx signal 1322 representative of the signaling state of the SDA line 1312.

The bus interface 1300 may include a processor 1340 that can be configured to provide an address of the slave device during an IBI arbitration procedure regardless of whether other slave devices are participating in the IBI arbitration procedure. The processor 1340 may include a microprocessor, digital signal processor, controller, sequencer and/or state machine. IBI management circuits used by the slave device for conventional IBI arbitration may be used in certain arbitration procedures disclosed herein. For example, the slave device is expected to withdraw its participation in a conventional IBI arbitration procedure when a different slave device is driving a higher-priority address on the SDA line 1312. In the illustrated example, the slave device monitors the SDA_Rx signal 1322 during the conventional IBI arbitration procedure to determine if a higher-priority address is being transmitted on the SDA line 1312.

According to certain aspects disclosed herein, the slave device may ignore the signaling state of the SDA line 1312 when the bus master is configured to detect multiple IBI requests in a single arbitration transaction. In one example, the bus master may configure one or more bits in an IBI Arbitration Mode register 1318 to indicate a Masked-Arbitration mode. In the Masked-Arbitration mode, the slave device is configured to participate in arbitration by providing its dynamic address in the SDA_TX signal 1324 provided to the transceiver 1302, while ignoring the SDA_Rx signal 1322 which otherwise provides an address feedback signal 1328 representative of the signaling state of the SDA line 1312. In one example, the SDA_Rx signal 1322 is masked using a multiplexer 1308 that provides the address feedback signal 1328, and that substitutes a serialized copy of the slave's dynamic address during Masked-Arbitration mode arbitration. A shift register 1306 may provide a serialized version 1334 of the dynamic address under control of the SCL_Rx signal 1320 in order to mimic the expected transmission by the slave during the arbitration transaction.

IBI Arbitration control logic 1316 may be configured to manage the arbitration process at the slave device. In some examples, the IBI Arbitration control logic 1316 includes a sequencer or state machine. In some examples, the IBI Arbitration control logic 1316 includes combinational logic. In some examples, the IBI Arbitration control logic 1316 cooperates with the processor 1340, or with another processor the slave device, such as a protocol controller. The IBI Arbitration control logic 1316 may respond to interrupts generated by an interrupt source 1314 in the slave device and may determine current mode of IBI arbitration. The IBI Arbitration control logic 1316 provides a select signal 1332 to the multiplexer 1308, where the select signal 1332 determines the source of the address feedback signal 1328. For example, the source of the select signal 1332 may be set to logic high in Masked-Arbitration mode when the shift register 1306 provides the address feedback signal 1328.

In certain implementations, the Masked-Arbitration mode may be enabled for a single IBI transaction and/or for a configured period of time. The IBI Arbitration control logic 1316 may receive a reset signal 1330 that terminates the Masked-Arbitration mode. In one example, the reset signal 1330 is provided by the processor 1340, a protocol controller, state machine, sequencer or other logic that can manage the slave device interaction with the serial bus. The reset signal 1330 may cause the Masked-Arbitration mode to be terminated after a NACK signal has been received and/or after a stop signal is received. In some instances, the Masked-Arbitration mode may be terminated based on state of one or more address bits transmitted during the arbitration process. For example, the Masked-Arbitration mode may be terminated when the A2 bit 1108 is set to logic-1 during an arbitration transaction.

Figure 14:
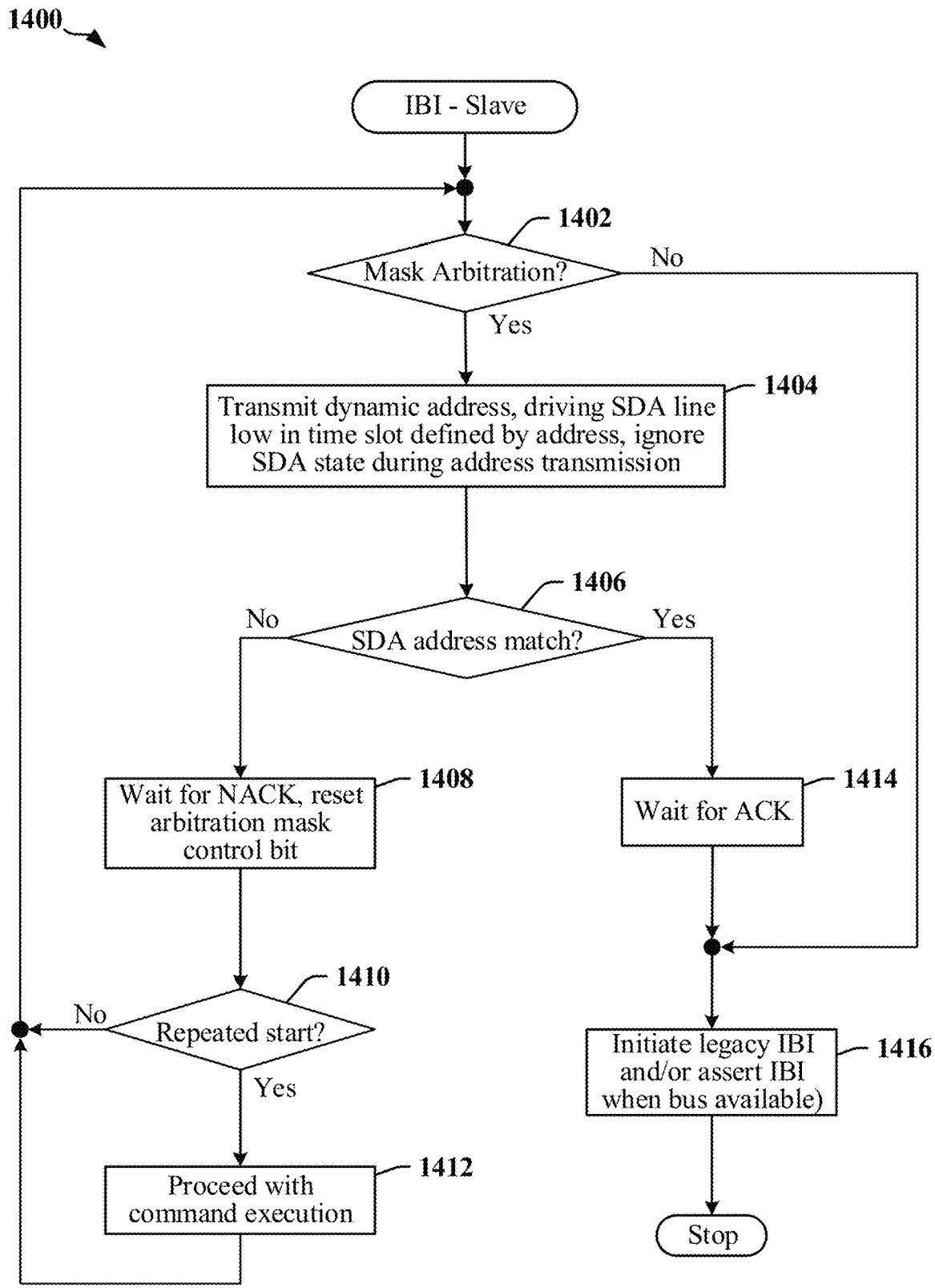
FIG. 14 illustrates operation of a slave device during an arbitration procedure conducted in accordance with certain aspects of this disclosure.

FIG. 14 is a flowchart 1400 illustrating operation of a slave device during an arbitration procedure conducted in accordance with certain aspects of this disclosure. In one example the slave device includes the bus interface 1300 illustrated in FIG. 13 and has a pending interrupt to be asserted. At block 1402, the slave device determines whether Masked-Arbitration mode has been set. If Masked-Arbitration mode is not set, the slave device may participate in one or more conventional IBI procedures at block 1416, reasserting an IBI request after losing one or more arbitration procedures. When Masked-Arbitration mode is set, the slave device transmits its dynamic address at block 1404, driving the SDA line 1312 low in a bit-time slot defined by the dynamic address of the slave device (see FIG. 11, for example). The bus interface 1300 of the slave device masks or otherwise ignores the signaling state of the SDA line 1312 during address transmission.

At block 1406, the mode IBI service may be selected based on the outcome of the address arbitration. When multiple devices participate in address arbitration, three or more bits of the combined slave response are set to zero (see address bits in FIG. 11) and the slave device may detect a NACK on the serial bus at block 1408. The NACK may cause the slave device to reset the one or more bits in an 1131 Arbitration Mode register 1318. The receipt of a repeated START at block 1410 may cause the slave device to participate in a transaction initiated by the bus master at block 1412. When only the slave device has participated in address arbitration, the slave device may detect an ACK on the serial bus at block 1414. The ACK may cause the slave device to participate in a conventional IBI procedure at block 1416.

Figure 15:
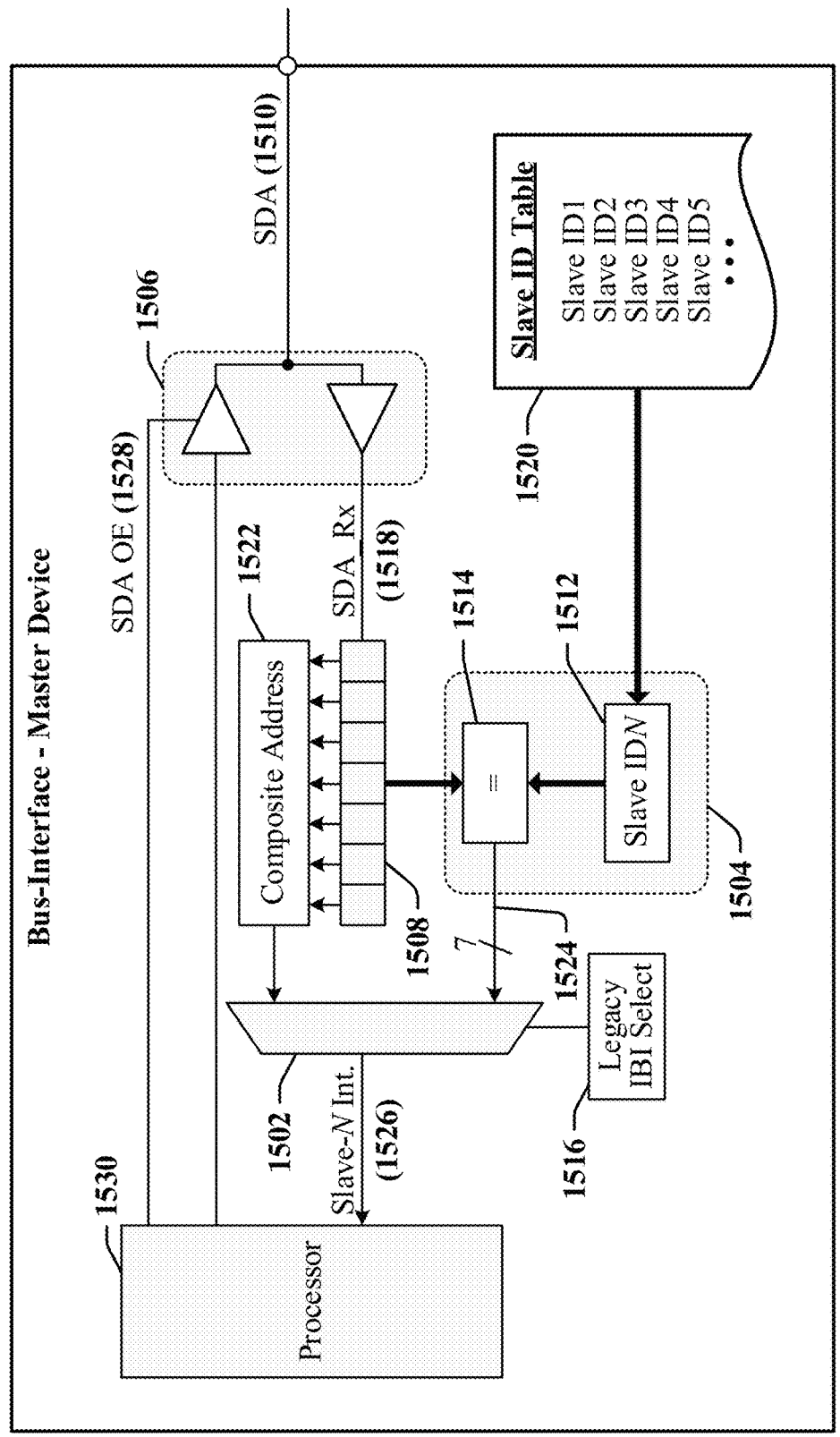
FIG. 15 illustrates an example of a bus interface in a master device that may be operated in accordance with certain aspects of this disclosure.

FIG. 15 illustrates an example of a bus interface 1500 in a master device that may be operated in accordance with certain aspects of this disclosure. The illustrated bus interface 1500 includes a transceiver 1506 that couples the slave device to the SDA line 1510. The transceiver 1506 may be control led by a signal (SDA_OE 1528) that enables or disables a line driver of the transceiver. SDA_OE 1528 may cause the line driver to operate in a push-pull mode, an open-drain mode, a high-impedance (disabled) mode, or another mode. The transceiver 1506 includes a receiver circuit that provides an SDA_Rx signal 1518 representative of the signaling state of the SDA line 1510, which may be captured as an address in a holding register 1508.

According to certain aspects disclosed herein, the master device may configure slave devices to operate in Masked-Arbitration mode, ignoring the signaling state of the SDA line 1510 during an arbitration transaction. The bus master may be configured to detect multiple 1131 requests in a single arbitration transaction. The bus master may determine the number and identity of devices requesting interrupt service based on the combined slave response and the correspondence of the allotted slave addresses 1104 (see FIG. 11) to individual bits in the composite address 1522 generated from the combined slave response. The bus master may be configured to provide a NACK when multiple slave devices are requesting interrupt service.

In one example, the bus interface 1500 may maintain a table of slave addresses 1520, which may be defined or configured by an application. The slave addresses may relate to slave devices that are expected to assert interrupts frequently, that may be expected to assert IBI requests concurrently with other slave devices, and/or that are associated with high-priority interrupts. In some implementations, the bus interface 1500 may maintain information regarding the order of servicing of the slave devices associated with slave addresses defined in the table of slave addresses 1520. The order of servicing may be defined and/or changed by an application, for example.

The bus interface 1500 may be configured to select between a conventional, address-priority arbitration procedure and a Masked-Arbitration arbitration procedure defined in accordance with certain aspects of this disclosure. In the illustrated example, the bus interface 1500 includes a multiplexer 1502 that can be used to provide a multi-bit interrupt status 1526 indicating interrupt-requesting slave devices from a composite address 1522 obtained during a Masked-Arbitration arbitration procedure and a bit-field 1524 obtained from multiple comparators 1504 that compare slave addresses to the address of the slave device that won a conventional, arbitration procedure. In one example, the master device controls the multiplexer 1502 by setting or clearing one or more bits of a register 1516. The master device may parse the multi-bit interrupt status 1526 to determine which slave devices are to be serviced. Each comparator 1504 may include multi-bit comparison logic 1514 and a buffer or register 1512 that reflects an address of a slave device indicated in the table of slave addresses 1520.

In some implementations, the bus interface 1500 includes a processor 1530, and/or a controller, sequencer, state machine or other logic that responds to commands from bus master circuits and/or an application processor. For example, selection of IBI arbitration mode may be made by a protocol controller and/or application processor based on a context or state of a system that includes the bus master.

In certain implementations, the Masked-Arbitration mode may be enabled for a single IBI transaction and/or for a configured period of time. In some instances, the Masked-Arbitration mode may be terminated by the bus interface based on serial bus control signaling provided by the bus interface 1500. For example, the Masked-Arbitration mode may be terminated when the bus interface 1500 transmits a NACK signal over the serial bus or provides a STOP condition on the serial bus.

Figure 16:
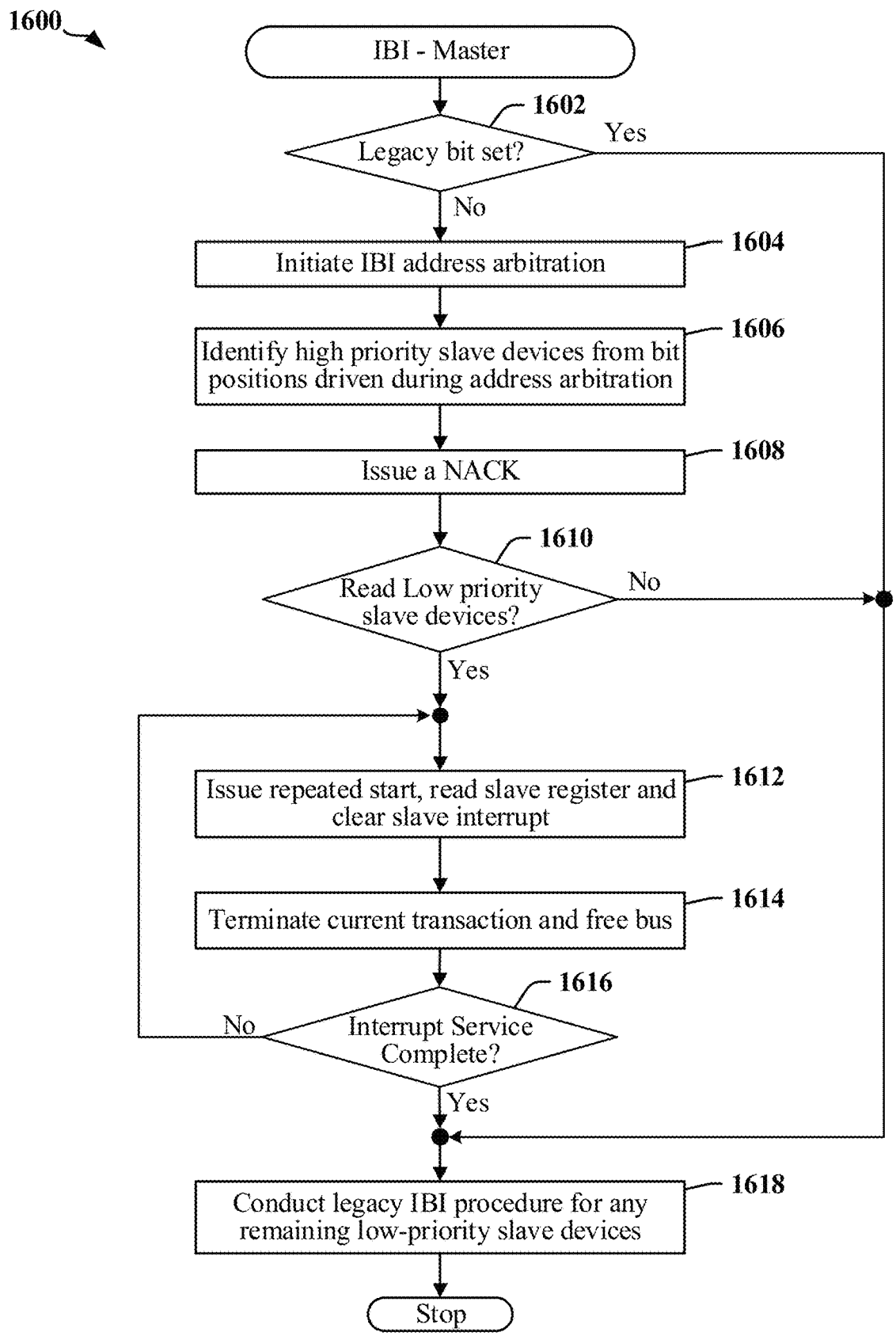
FIG. 16 illustrates the operation of a bus master device during an arbitration procedure conducted in accordance with certain aspects of this disclosure.

FIG. 16 is a flowchart 1600 illustrating the operation of a bus master device during an arbitration procedure conducted in accordance with certain aspects of this disclosure. In one example the bus master device includes the bus interface 1500 illustrated in FIG. 15 and has detected assertion of an interrupt. At block 1602, the bus master device determines whether conventional 1131 arbitration mode has been set. If conventional 1131 arbitration mode is set, the bus master device may initiate one or more conventional IBI procedures at block 1618. When conventional IBI arbitration mode is not set, the bus master device initiates an IBI address arbitration at block 1604. At block 1606, the bus interface 1500 of the bus master device receives a composite address 1522 generated from the combined slave response. In one example, each interrupt-requesting slave device is represented by a zero-value bit in the composite address 1522.

At block 1608, the bus master device causes a NACK to be provided on the serial bus. The NACK may cause the bus master device and the slave devices to reset their respective IBI arbitration mode indicators. When the bus master device determines at block 1610 that low-priority devices need not be serviced in the current IBI arbitration, the bus master device may initiate one or more conventional IBI procedures at block 1618. When the bus master device determines at block 1610 that low-priority devices are to be serviced, the bus master device may initiate one or more transactions commencing at block 1612 to service and/or clear interrupts at the interrupt-requesting slave devices. For each transaction, the bus master device may transmit a repeated START and read interrupt one or more registers at a slave device. Each transaction is terminated at block 1614 and the bus master device may determine at block 1616 whether additional transactions are to be initiated at block 1612. When no further transactions are to be conducted the bus master may cause the serial bus to be idled and/or may initiate one or more conventional IBI procedures at block 1618.

Figure 17:
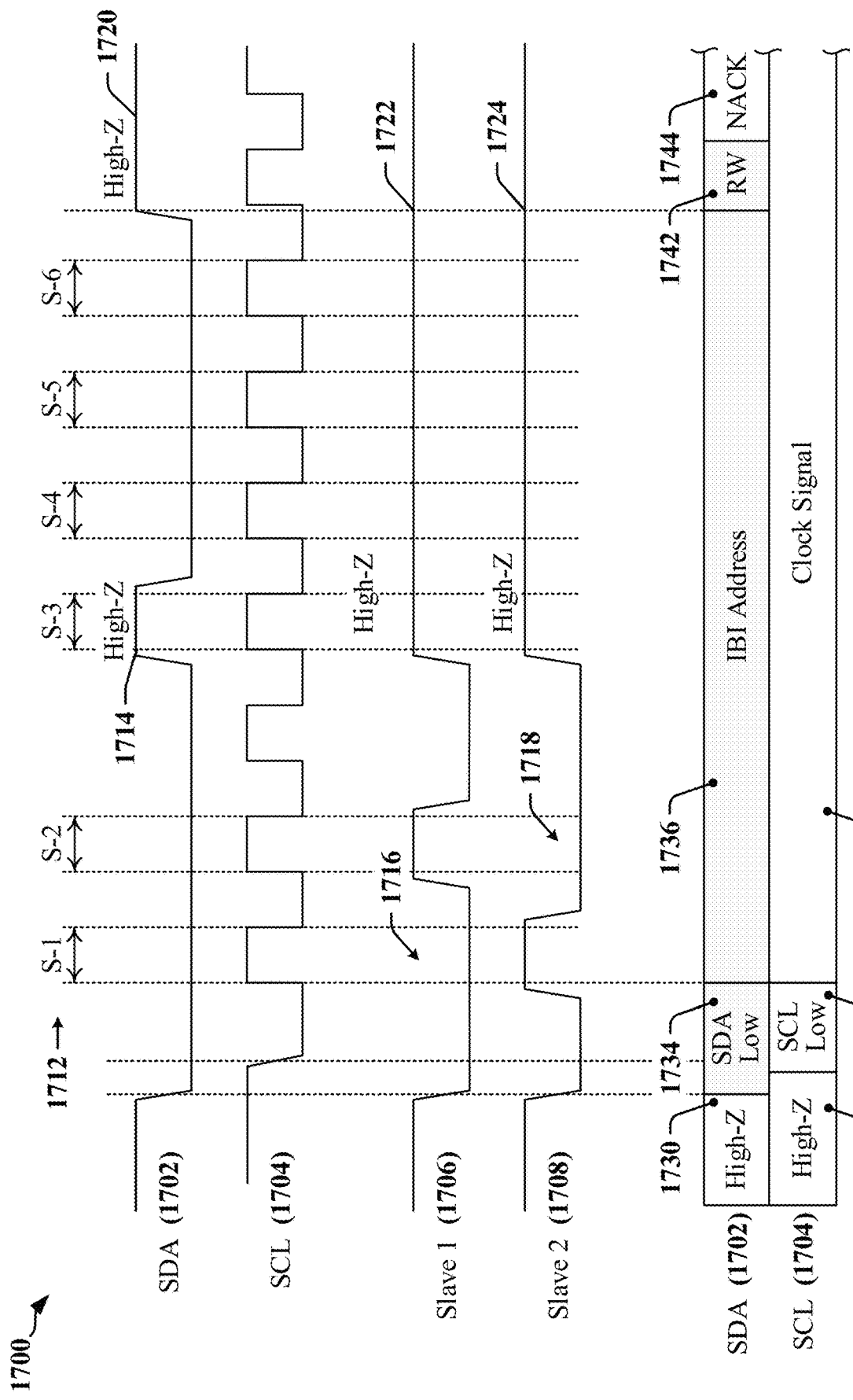
FIG. 17 is a timing diagram that illustrates certain aspects of a masked-arbitration mode transaction conducted in accordance with certain aspects of this disclosure.

FIG. 17 is a timing diagram 1700 that illustrates certain aspects of a Masked-Arbitration mode transaction conducted in accordance with certain aspects of this disclosure. The illustrated transaction enables a bus master device to receive notification of pending interrupt requests for up to 6 slave devices. The ability to support p to 6 interrupting slave devices provides sufficient capability in certain multimedia implementations, for example. The timing diagram 1700 illustrates an example in which 5 of the 6 slave devices are requesting interrupt service. The SDA line 1702 is driven low in each of the five bit-slots 1712 assigned for the low-value address bits in the corresponding slave addresses. One slave device, which has a slave address with a zero-value A3 bit, is not requesting interrupt service and the SDA line is pulled high 1714 in the corresponding bit slot (S-3). The SDA line 1702 may be pulled high 1714, 1720 when each of the slave devices has caused its line driver to enter a high-impedance state and the bus master device is not driving the SDA line 1702. The bus master device may provide a NACK 1744 by refraining from driving the SDA line 1702 after all bits of the IBI address 1736 and a read/write bit 1742 have been transmitted, such that the SDA line remains in a high-impedance state and is pulled high 1720.

The bit slots have a duration defined by the period of the clock signal transmitted on the SCL line 1704. The SDA line 1702 and the SCL line 1704 are initially in high-impedance state 1730, 1732 until the SDA line 1702 is driven low 1734. The SDA line 1702 may be driven low 1734 when the bus master device is providing a START condition preceding an arbitrable address header. The SDA line 1702 may be driven low 1734 by one or more slave devices asserting an IBI. The bus master device drives the SCL line 1704 low 1738 to complete the START condition, and then provides a clock signal 1740.

The contributions 1706, 1708 of two slave devices to the driving of the SDA line 1702 are illustrated. A first slave device drives the SDA line 1702 low 1716 during a first, highest-priority bit-slot (S-1) while a second slave device drives the SDA line 1702 low 1718 during a second bit-slot (S-2). Both slave devices drive the SDA line 1702 low 1716 during the bit-slot that follows slot S-2, which corresponds to the A2 bit of the slave addresses (see FIG. 11). The slave devices refrain from driving the SDA line 1702 during other bit-slots, entering or remaining in a high-impedance state 1722, 1724.

Figure 18:
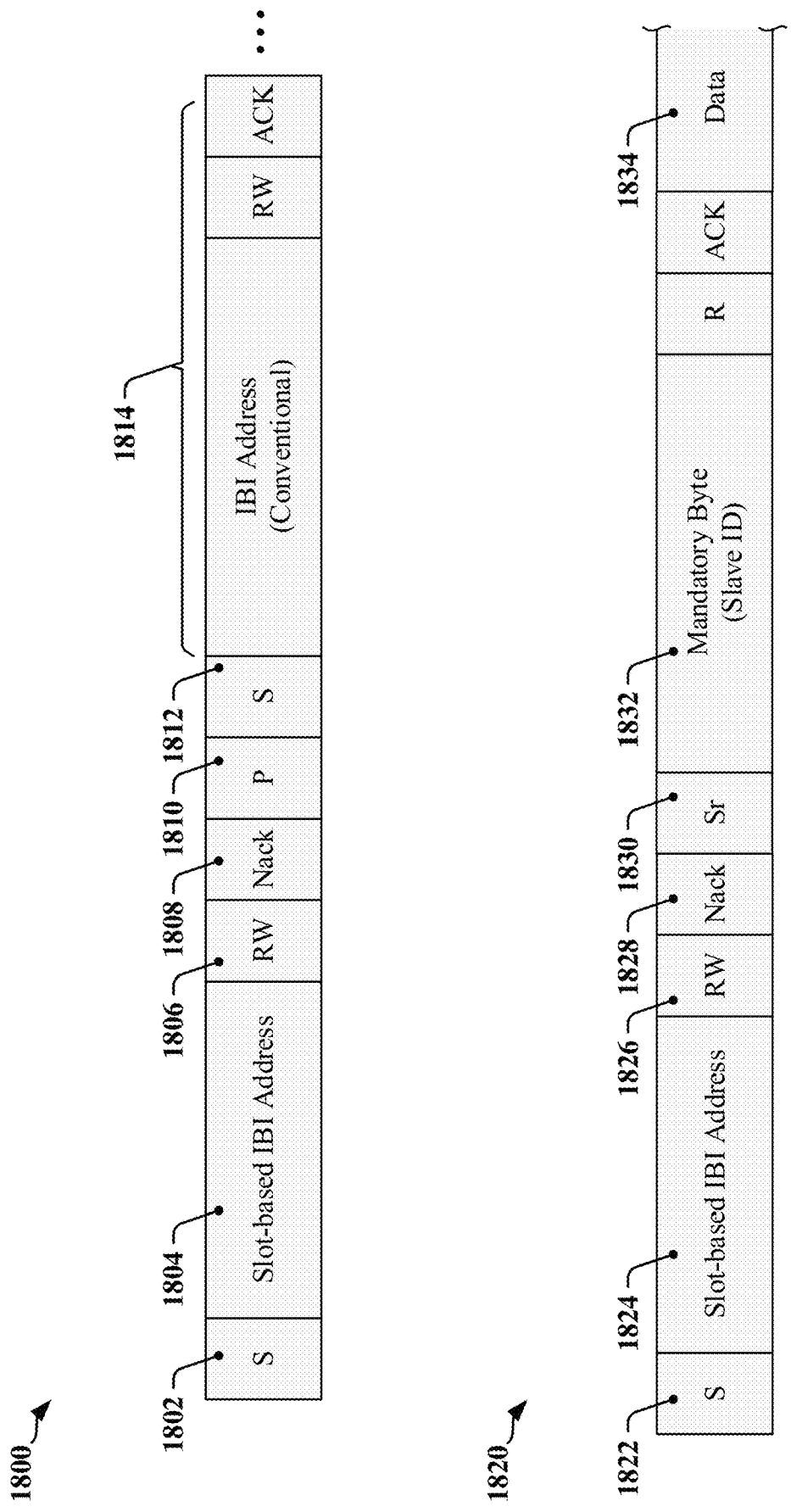
FIG. 18 illustrates certain IBI procedures that may be conducted in accordance with certain aspects disclosed herein.

FIG. 18 illustrates certain aspects of IBI procedures 1800, 1820 that may be conducted when bus master devices and slave devices are configured in accordance with certain aspects disclosed herein. I3C specifications provide for different types of IBI participation of slave devices. For example, a slave device may include a register with a bit (referred to herein as "BCR[2]") that indicates whether the slave device is to provide a payload when participating successfully in an IBI arbitration procedure. According to certain aspects disclosed herein the bus aster device provides a NACK after the address has been transmitted during an IBI arbitration procedure. The bus master device is then free to service the slave devices in a priority and manner defined by or for the bus master device.

In the first IBI procedure 1800, bus master device conducts a Masked-Arbitration mode arbitration commencing with a START condition 1802, after which the slave devices provide a combined slot-based IBI address 1804, with the RW bit 1806. The bus master device provides a NACK 1808 and terminates the arbitration transaction with a STOP condition 1810. The bus master device then provides a START condition 1812 to enable a conventional IBI procedure 1814. The use of a conventional IBI procedure 1814 may be eliminated if the slave device provides an address for the mandatory-byte that forms the payload required by BCR[2] setting.

The second IBI procedure 1820 illustrates a Masked-Arbitration mode arbitration followed by a sequence of transactions in which the bus master device may service multiple interrupt-requesting slave devices. The bus master device may read the mandatory-byte of one or more slave devices when it knows the address of the mandatory byte. The masked-Arbitration mode arbitration commences with a START condition 1822, after which the slave devices provide a combined slot-based WI address 1824, with the RW bit 1826. The bus master device provides a NACK 1828 and initiates the sequence of transactions by transmitting a repeated START condition 1830. In the illustrated example, the bus master device reads a mandatory byte 1832 and/or data 1834 from other registers in the slave device. Reading the mandatory byte 1832 may clear the interrupt at a slave device.

Examples of Processing Circuits and Methods

Figure 19:
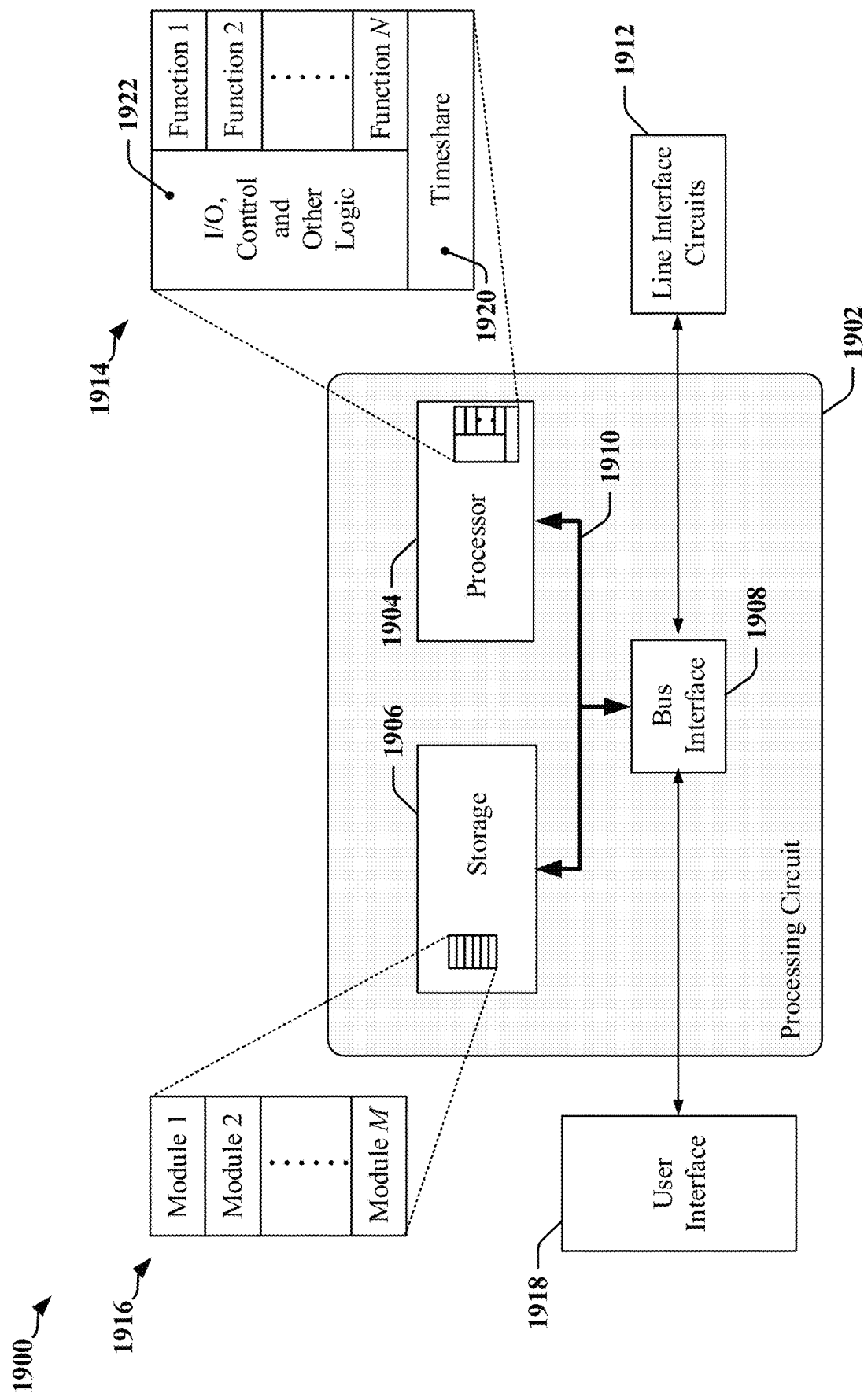
FIG. 19 illustrates an apparatus employing a processing circuit that may be adapted according to certain aspects disclosed herein.

FIG. 19 is a diagram illustrating an example of a hardware implementation for an apparatus 1900 employing a processing circuit 1902 that may be configured to perform one or more functions disclosed herein. In accordance with various aspects of the disclosure, an element, or any portion of an element, or any combination of elements as disclosed herein may be implemented using the processing circuit 1902. The processing circuit 1902 may include one or more processors 1904 that are controlled by some combination of hardware and software modules. Examples of processors 1904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation. In various examples, the processing circuit 1902 may be implemented using a state machine, sequencer, signal processor and/or general-purpose processor, or a combination of such devices and circuits.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including the one or more processors 1904, and storage 1906. Storage 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more transceivers 1912. A transceiver 1912 may be provided for each networking technology supported by the processing circuit. In some instances, multiple networking technologies may share some or all of the circuitry or processing modules found in a transceiver 1912. Each transceiver 1912 provides a means for communicating with various other apparatus over a transmission medium. Depending upon the nature of the apparatus 1900, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium that may include the storage 1906. In this respect, the processing circuit 1902, including the processor 1904, may be used to implement any of the methods, functions and techniques disclosed herein. The storage 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1906 or in an external computer-readable medium. The external computer-readable medium and/or storage 1906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1906 may also include, by way of example, a carrier wave, a transmission line, and any other suitable medium for transmitting software and/or instructions that may be accessed and read by a computer. Computer-readable medium and/or the storage 1906 may reside in the processing circuit 1902, in the processor 1904, external to the processing circuit 1902, or be distributed across multiple entities including the processing circuit 1902. The computer-readable medium and/or storage 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as the transceiver 1912, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to the transceiver 1912, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the transceiver 1912, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

Figure 20:
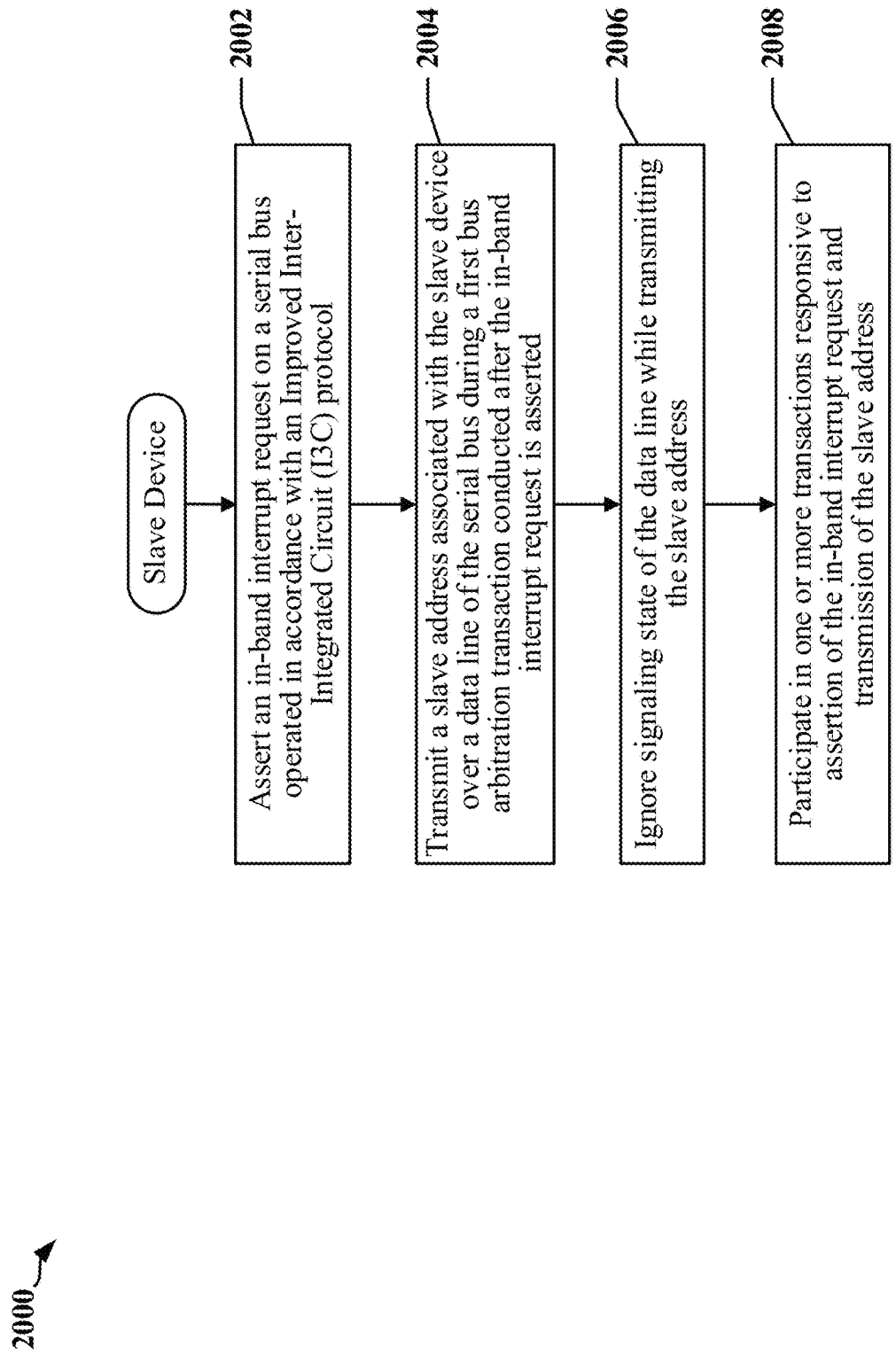
FIG. 20 is a flowchart illustrating certain aspects of a method for bus arbitration that may be performed at a slave device in accordance with certain aspects disclosed herein.

FIG. 20 is a flowchart 2000 illustrating a method for a bus arbitration procedure that may be performed at a slave device coupled to a serial bus. The serial bus may be operated in accordance with one or more protocols such as an I2C, I3C, RFFE, SPMI and/or SMB protocol. At block 2002, the slave device may assert an in-band interrupt request on a serial bus operated in accordance with an I3C protocol. At block 2004, the slave device may transmit a slave address associated with the slave device over a data line of the serial bus during a first bus arbitration transaction conducted after the in-band interrupt request is asserted. At block 2006, the slave device may ignore signaling state of the data line while transmitting the slave address. At block 2008, the slave device may participate in one or more transactions responsive to assertion of the in-band interrupt request and transmission of the slave address. At least one other slave device may transmit an address over the data line during the first bus arbitration transaction.

In some implementations, the slave device may monitor signaling state of the data line during a second bus arbitration transaction, and withdraw from the second bus arbitration transaction after detecting transmission of a higher-priority slave address on the data line during the second bus arbitration transaction. The slave device may transmit a non-zero bit of the slave address over the data line during a second bus arbitration transaction, and withdraw from the second bus arbitration transaction after detecting that a signaling state of the data line is indicative of a zero bit while the non-zero bit of the slave address is being transmitted.

In certain implementations, each of a plurality of slave devices is uniquely identifiable by location of a zero-value bit in its corresponding slave address. The slave device may receive a negative acknowledgement responsive to the first bus arbitration transaction. The one or more transactions follow the negative acknowledgement in transmission.

In some instances, the slave device may transmit a payload byte mandated by the I3C protocol in response to a read command in the one or more transactions. The slave device may clear an interrupt source in response to a read command transmitted by a bus master in the one or more transactions.

Figure 21:
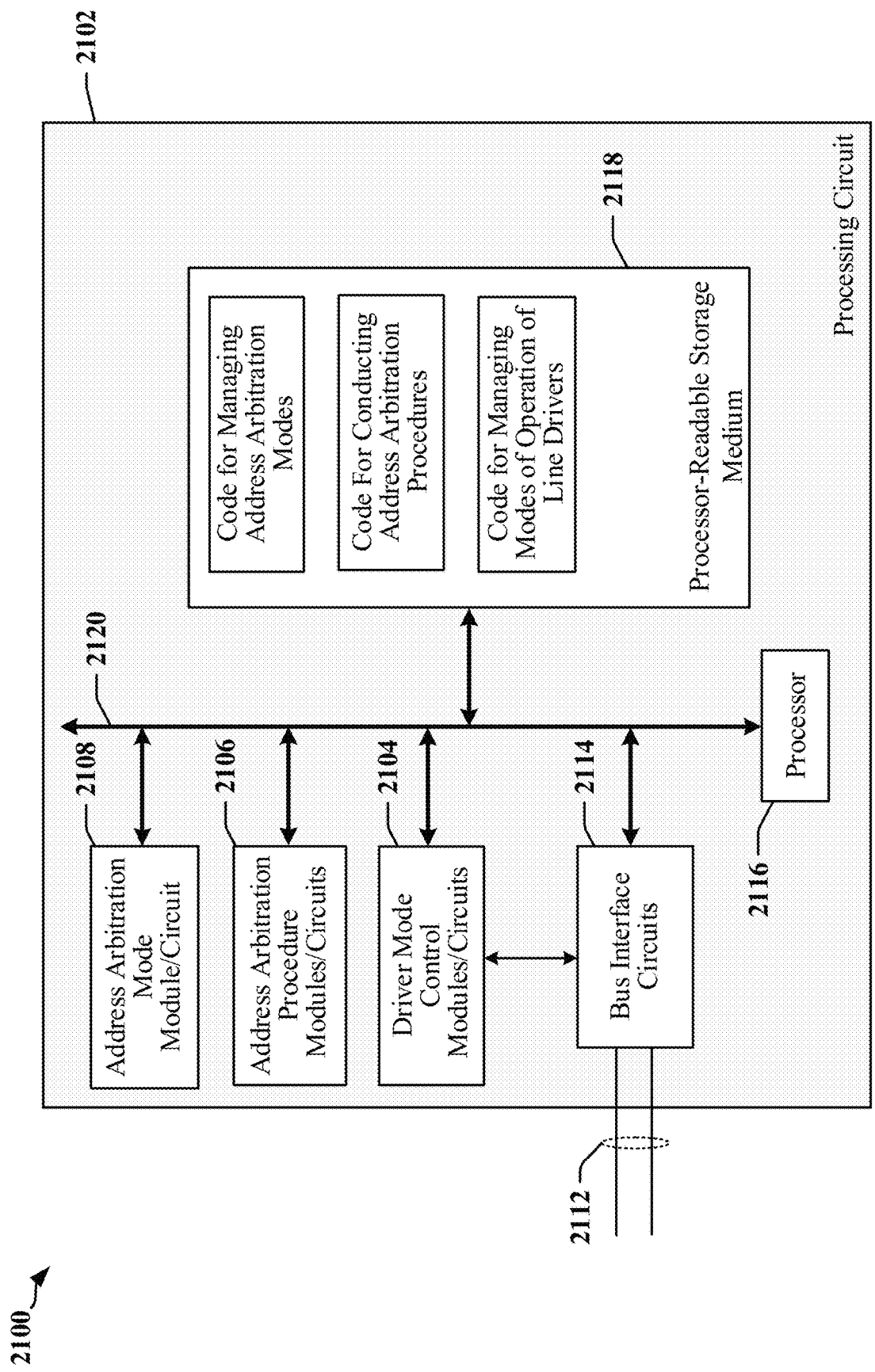
FIG. 21 illustrates an apparatus involved in bus arbitration as a slave device in accordance with certain aspects disclosed herein.

FIG. 21 is a diagram illustrating an example of a hardware implementation for an apparatus 2100 employing a processing circuit 2102. In one example, the apparatus 2100 is configured for data communication over a serial bus that is operated in accordance with one or more I3C protocols. The processing circuit typically has a controller or processor 2116 that may include one or more microprocessors, microcontrollers, digital signal processors, sequencers and/or state machines. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the controller or processor 2116, the modules or circuits 2104, 2106 and 2108, and the processor-readable storage medium 2118. The apparatus may be coupled to a multi-wire communication link using a physical layer circuit such as the bus interface circuit 2114. The bus interface circuit 2114 may operate the multi-wire serial bus 2112 to support communications in accordance with I3C protocols. The bus 2120 may also link various other circuits such as timing sources, peripherals, voltage regulators, and power management circuits, which are well known in the art, and therefore, will not be described any further.

The processor 2116 is responsible for general processing, including the execution of software, code and/or instructions stored on the processor-readable storage medium 2118. The processor-readable storage medium 2118 may include non-transitory storage media. The software, when executed by the processor 2116, causes the processing circuit 2102 to perform the various functions described supra for any particular apparatus. The processor-readable storage medium 2118 may be used for storing data that is manipulated by the processor 2116 when executing software. The processing circuit 2102 further includes at least one of the modules 2104, 2106 and 2108. The modules 2104, 2106 and 2108 may be software modules running in the processor 2116, resident/stored in the processor-readable storage medium 2118, one or more hardware modules coupled to the processor 2116, or some combination thereof. The modules 2104, 2106 and 2108 may include microcontroller instructions, state machine configuration parameters, or some combination thereof.

In one configuration, the apparatus 2100 includes a bus interface circuit 2114 that may include one or more line driver circuits that couple the apparatus 2100 to a multi-wire serial bus 2112. The apparatus 2100 includes modules and/or circuits 2108 configured to select and/or configure a mode for conducting IBI arbitration, modules and/or circuits 2106 configured to participate in address arbitration processes on the serial bus, and modules and/or circuits 2104 configured to control operation of line driver circuits in the bus interface circuit 2114, including configuring the line driver circuits for open-drain, push-pull and/or other modes of operation.

In one example, the apparatus 2100 includes a processor 2116 configured to assert an in-band interrupt request on a serial bus operated in accordance with an I3C protocol, transmit a slave address associated with the slave device over a data line of the serial bus during a first bus arbitration transaction conducted after the in-band interrupt request is asserted, ignore signaling state of the data line while transmitting the slave address, and participate in one or more transactions responsive to assertion of the in-band interrupt request and transmission of the slave address. At least one other slave device may transmit an address over the data line during the first bus arbitration transaction.

In some instances, the processor 2116 is configured to monitor signaling state of the data line during a second bus arbitration transaction, and withdraw from the second bus arbitration transaction after detecting transmission of a higher-priority slave address on the data line during the second bus arbitration transaction. The processor 2116 may be configured to transmit a non-zero bit of the slave address over the data line during a second bus arbitration transaction, and withdraw from the second bus arbitration transaction after detecting that a signaling state of the data line is indicative of a zero bit while the non-zero bit of the slave address is being transmitted. Each of a plurality of slave devices can be uniquely identifiable by location of a zero-value bit in its corresponding slave address.

In some implementations, the processor 2116 is configured to receive a negative acknowledgement responsive to the first bus arbitration transaction. The one or more transactions follow the negative acknowledgement in transmission. The processor 2116 may be configured to transmit a payload byte mandated by the I3C protocol in response to a read command in the one or more transactions. The processor 2116 may be configured to clear an interrupt source in response to a read command transmitted by a bus master in the one or more transactions.

The processor-readable storage medium 2118 may include instructions that cause the processing circuit 2102 to assert an in-band interrupt request on a serial bus operated in accordance with an I3C protocol, transmit a slave address associated with the slave device over a data line of the serial bus during a first bus arbitration transaction conducted after the in-band interrupt request is asserted, ignore signaling state of the data line while transmitting the slave address, and participate in one or more transactions responsive to assertion of the in-band interrupt request and transmission of the slave address. At least one other slave device may transmit an address over the data line during the first bus arbitration transaction.

The processor-readable storage medium 2118 may include instructions that cause the processing circuit 2102 to monitor signaling state of the data line during a second bus arbitration transaction, and withdraw from the second bus arbitration transaction after detecting transmission of a higher-priority slave address on the data line during the second bus arbitration transaction.

The processor-readable storage medium 2118 may include instructions that cause the processing circuit 2102 to transmit a non-zero bit of the slave address over the data line during a second bus arbitration transaction, and withdraw from the second bus arbitration transaction after detecting that a signaling state of the data line is indicative of a zero bit while the non-zero bit of the slave address is being transmitted. Each of a plurality of slave devices is uniquely identifiable by location of a zero-value bit in its corresponding slave address.

The processor-readable storage medium 2118 may include instructions that cause the processing circuit 2102 to receive a negative acknowledgement responsive to the first bus arbitration transaction. The one or more transactions follow the negative acknowledgement in transmission. The processor-readable storage medium 2118 may include instructions that cause the processing circuit 2102 to transmit a payload byte mandated by the I3C protocol in response to a read command in the one or more transactions. The processor-readable storage medium 2118 may include instructions that cause the processing circuit 2102 to clear an interrupt source in response to a read command transmitted by a bus master in the one or more transactions.

Figure 22:
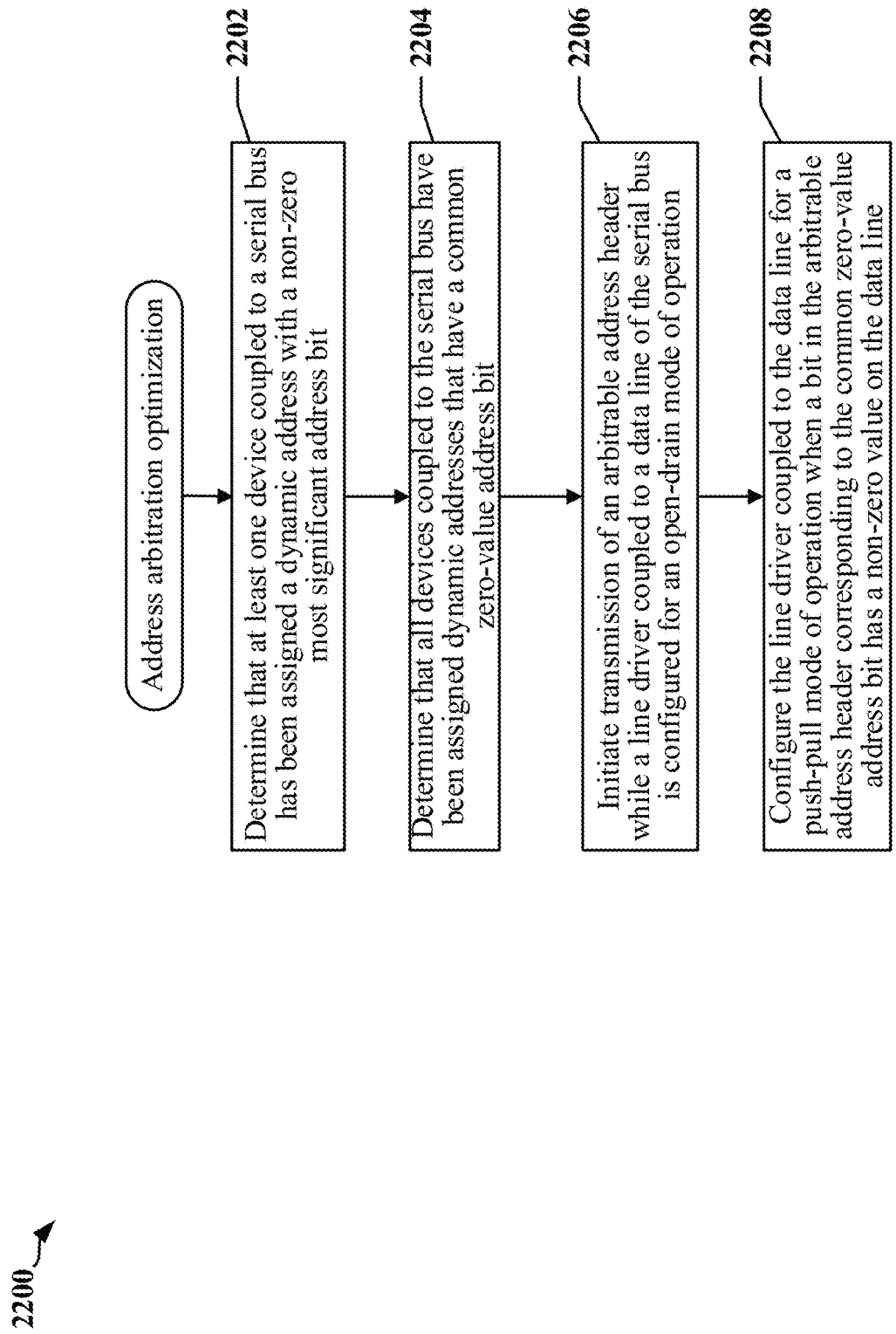
FIG. 22 is a flowchart illustrating certain aspects of a method for bus arbitration that may be performed at a master device in accordance with certain aspects disclosed herein.

FIG. 22 is a flowchart 2200 illustrating a method for a bus arbitration procedure that may be performed at a master device coupled to a serial bus. The serial bus may be operated in accordance with one or more protocols such as an I2C, I3C, RFFE, SPMI and/or SMB protocol. At block 2202, the master device may detect an in-band interrupt request from a serial bus operated in accordance with I3C protocols. At block 2204, the master device may receive a composite address generated by two or more slave devices that participate in a first bus arbitration transaction conducted in response to the in-band interrupt request. At block 2206, the master device may identify the two or more slave devices from zero-value bits in the composite address. At block 2208, the master device may initiate one or more transactions responsive to the in-band interrupt request. Each of the two or more slave devices transmit their respective slave addresses concurrently over a data line of the serial bus during the first bus arbitration transaction. The master device may configure each of the plurality of slave devices to ignore signaling state of the data line of the serial bus while transmitting its respective slave address.

In some examples, the master device may read a mandatory byte from at least one of the two or more slave devices after identifying the two or more slave devices. The mandatory byte may be provided in accordance with an I3C protocol governing in-band interrupts. The master device may clear an interrupt source in at least one of the two or more slave devices after identifying the two or more slave devices. The master device may provide a negative acknowledgement after receiving the composite address in the first bus arbitration transaction.

In various examples, the master device may assign a slave address to each of a plurality of slave devices coupled to the serial bus. Each of the plurality of slave devices is uniquely identifiable by location of a zero-value bit in its assigned slave address, and configure each of the plurality of slave devices with its assigned slave address.

Figure 23:
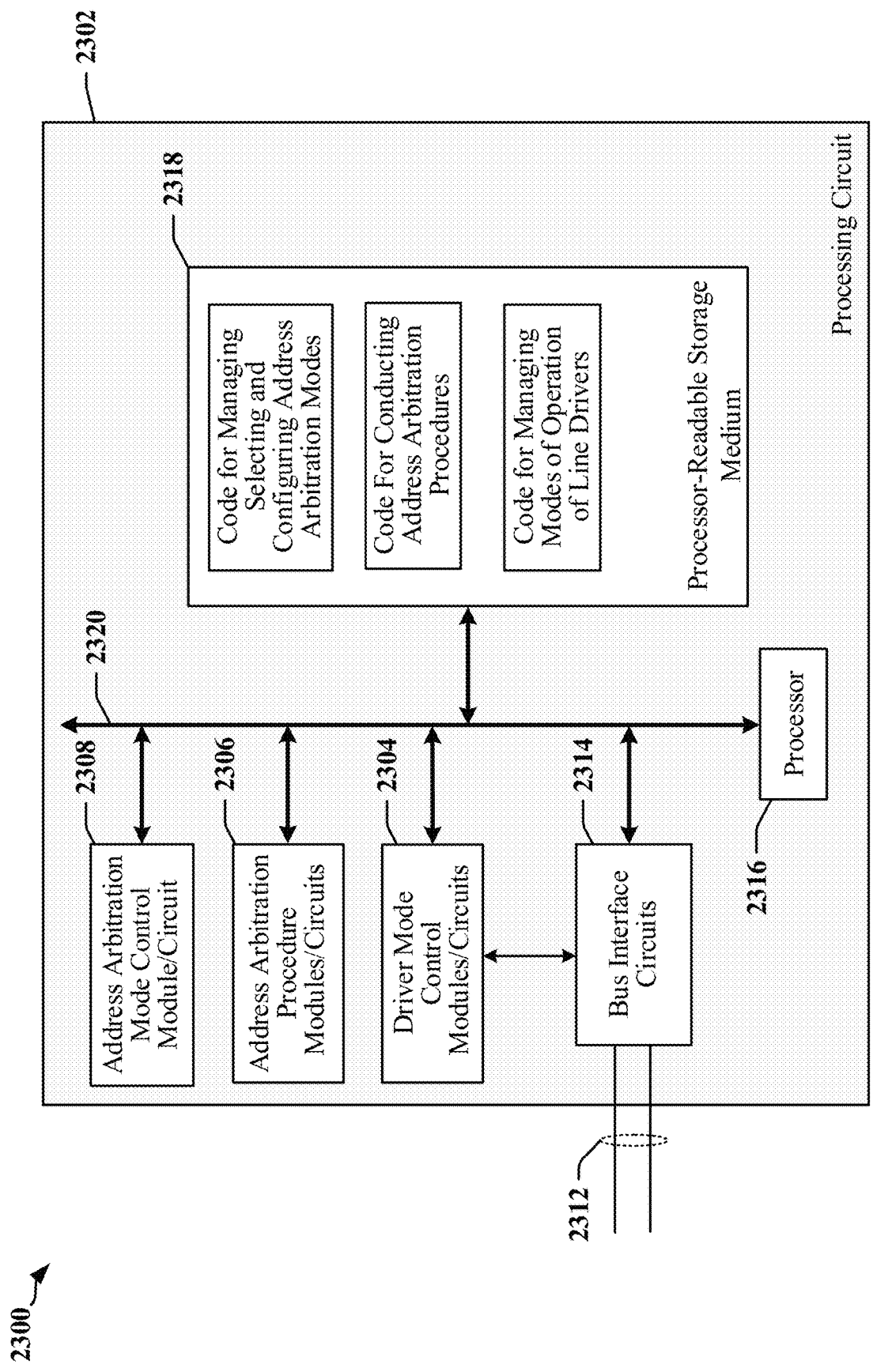
FIG. 23 illustrates an apparatus involved in bus arbitration as a master device in accordance with certain aspects disclosed herein.

FIG. 23 is a diagram illustrating an example of a hardware implementation for an apparatus 2300 employing a processing circuit 2302. In one example, the apparatus 2300 is configured for data communication over a serial bus that is operated in accordance with one or more I3C protocols. The processing circuit typically has a controller or processor 2316 that may include one or more microprocessors, microcontrollers, digital signal processors, sequencers and/or state machines. The processing circuit 2302 may be implemented with a bus architecture, represented generally by the bus 2320. The bus 2320 may include any number of interconnecting buses and bridges depending on the specific application of the processing circuit 2302 and the overall design constraints. The bus 2320 links together various circuits including one or more processors and/or hardware modules, represented by the controller or processor 2316, the modules or circuits 2304, 2306 and 2308, and the processor-readable storage medium 2318. The apparatus may be coupled to a multi-wire communication link using a physical layer circuit such as the bus interface circuit 2314. The bus interface circuit 2314 may operate the multi-wire serial bus 2312 to support communications in accordance with I3C protocols. The bus 2320 may also link various other circuits such as timing sources, peripherals, voltage regulators, and power management circuits, which are well known in the art, and therefore, will not be described any further.

The processor 2316 is responsible for general processing, including the execution of software, code and/or instructions stored on the processor-readable storage medium 2318. The processor-readable storage medium 2318 may include non-transitory storage media. The software, when executed by the processor 2316, causes the processing circuit 2302 to perform the various functions described supra for any particular apparatus. The processor-readable storage medium 2318 may be used for storing data that is manipulated by the processor 2316 when executing software. The processing circuit 2302 further includes at least one of the modules 2304, 2306 and 2308. The modules 2304, 2306 and 2308 may be software modules running in the processor 2316, resident/stored in the processor-readable storage medium 2318, one or more hardware modules coupled to the processor 2316, or some combination thereof. The modules 2304, 2306 and 2308 may include microcontroller instructions, state machine configuration parameters, or some combination thereof.

In one configuration, the apparatus 2300 includes a bus interface circuit 2314 that may include one or more line driver circuits that couple the apparatus 2300 to a multi-wire serial bus 2312. The apparatus 2300 includes modules and/or circuits 2308 configured to manage, select and/or configure a mode for conducting IBI arbitration, modules and/or circuits 2306 configured to participate in address arbitration processes on the serial bus, and modules and/or circuits 2304 configured to control operation of line driver circuits in the bus interface circuit 2314, including configuring the line driver circuits for open-drain, push-pull and/or other modes of operation.

In one example, the apparatus 2300 includes a processor 2316 configured to detect an in-band interrupt request from a serial bus operated in accordance with I3C protocols, receive a composite address generated by two or more slave devices that participate in a first bus arbitration transaction conducted in response to the in-band interrupt request, identify the two or more slave devices from zero-value bits in the composite address, and initiate one or more transactions responsive to the in-band interrupt request. Each of the two or more slave devices transmit their respective slave addresses concurrently over a data line of the serial bus during the first bus arbitration transaction.

The processor 2316 may be configured to configure each of the plurality of slave devices to ignore signaling state of the data line of the serial bus while transmitting its respective slave address. The processor 2316 may be configured to read a mandatory byte from at least one of the two or more slave devices after identifying the two or more slave devices. The mandatory byte may be provided in accordance with an I3C protocol governing in-band interrupts. The processor 2316 may be configured to clear an interrupt source in at least one of the two or more slave devices after identifying the two or more slave devices.

The processor 2316 may be configured to provide a negative acknowledgement after receiving the composite address in the first bus arbitration transaction. The processor 2316 may be configured to assign a slave address to each of a plurality of slave devices coupled to the serial bus. Each of the plurality of slave devices is uniquely identifiable by location of a zero-value bit in its assigned slave address, and configure each of the plurality of slave devices with its assigned slave address.

The processor-readable storage medium 2318 may include instructions that cause the processing circuit 2302 to detect an in-band interrupt request from a serial bus operated in accordance with I3C protocols, receive a composite address generated by two or more slave devices that participate in a first bus arbitration transaction conducted in response to the in-band interrupt request, identify the two or more slave devices from zero-value bits in the composite address, and initiate one or more transactions responsive to the in-band interrupt request. Each of the two or more slave devices transmit their respective slave addresses concurrently over a data line of the serial bus during the first bus arbitration transaction.

The processor-readable storage medium 2318 may include instructions that cause the processing circuit 2302 to configure each of the plurality of slave devices to ignore signaling state of the data line of the serial bus while transmitting its respective slave address. The processor-readable storage medium 2318 may include instructions that cause the processing circuit 2302 to read a mandatory byte from at least one of the two or more slave devices after identifying the two or more slave devices. The mandatory byte may be provided in accordance with an I3C protocol governing in-band interrupts. The processor-readable storage medium 2318 may include instructions that cause the processing circuit 2302 to clear an interrupt source in at least one of the two or more slave devices after identifying the two or more slave devices.

The processor-readable storage medium 2318 may include instructions that cause the processing circuit 2302 to provide a negative acknowledgement after receiving the composite address in the first bus arbitration transaction. The processor-readable storage medium 2318 may include instructions that cause the processing circuit 2302 to assign a slave address to each of a plurality of slave devices coupled to the serial bus. Each of the plurality of slave devices is uniquely identifiable by location of a zero-value bit in its assigned slave address, and configure each of the plurality of slave devices with its assigned slave address.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for bus arbitration performed at a slave device, comprising:
   asserting an in-band interrupt request on a serial bus operated in accordance with an Improved Inter-Integrated Circuit (I3C) protocol;

transmitting a slave address associated with the slave device over a data line of the serial bus during a first bus arbitration transaction conducted after the in-band interrupt request is asserted;
ignoring a change in signaling state of the data line indicating transmission by a higher-priority device while transmitting the slave address during the first bus arbitration transaction; and
participating in one or more transactions responsive to assertion of the in-band interrupt request and transmission of the slave address.

2. The method of claim 1, wherein at least one higher-priority slave device transmits an address over the data line during the first bus arbitration transaction.

3. The method of claim 1, further comprising:
monitoring signaling state of the data line during a second bus arbitration transaction; and
withdrawing from the second bus arbitration transaction after detecting transmission of a higher-priority slave address over the data line during the second bus arbitration transaction.

4. The method of claim 1, further comprising:
transmitting a non-zero bit of the slave address over the data line during a second bus arbitration transaction; and
withdrawing from the second bus arbitration transaction after detecting that a signaling state of the data line is indicative of a zero bit while the non-zero bit of the slave address is being transmitted.

5. The method of claim 1, wherein each of a plurality of slave devices is uniquely identifiable by location of a zero-value bit in its corresponding slave address.

6. The method of claim 1, further comprising:
receiving a negative acknowledgement responsive to the first bus arbitration transaction, wherein the one or more transactions follow the negative acknowledgement in transmission.

7. The method of claim 6, further comprising:
transmitting a payload byte mandated by the I3C protocol in response to a read command in the one or more transactions.

8. The method of claim 6, further comprising:
clearing an interrupt source in response to a read command transmitted by a bus master in the one or more transactions.

9. An apparatus configured for data communication, comprising:
a bus interface circuit having a line driver configured to couple the apparatus to a data line of a serial bus operated in accordance with an Improved Inter-Integrated Circuit (I3C) protocol; and
a processor configured to:
assert an in-band interrupt request on the serial bus;
transmit a slave address associated with the apparatus over the data line of the serial bus during a first bus arbitration transaction conducted after the in-band interrupt request is asserted;
ignore a change in signaling state of the data line indicating transmission by a higher-priority device while transmitting the slave address during the first bus arbitration transaction; and
participate in one or more transactions responsive to assertion of the in-band interrupt request and transmission of the slave address.

10. The apparatus of claim 9, wherein at least one higher-priority slave device transmits an address over the data line during the first bus arbitration transaction.

11. The apparatus of claim 9, wherein the processor is further configured to:
monitor signaling state of the data line during a second bus arbitration transaction; and
withdraw from the second bus arbitration transaction after detecting transmission of a higher-priority slave address over the data line during the second bus arbitration transaction.

12. The apparatus of claim 9, wherein the processor is further configured to:
transmit a non-zero bit of the slave address over the data line during a second bus arbitration transaction; and
withdraw from the second bus arbitration transaction after detecting that a signaling state of the data line is indicative of a zero bit while the non-zero bit of the slave address is being transmitted.

13. The apparatus of claim 9, wherein each of a plurality of slave devices is uniquely identifiable by location of a zero-value bit in its corresponding slave address.

14. The apparatus of claim 9, wherein the processor is further configured to:
receive a negative acknowledgement responsive to the first bus arbitration transaction, wherein the one or more transactions follow the negative acknowledgement in transmission.

15. The apparatus of claim 14, wherein the processor is further configured to:
transmit a payload byte mandated by the I3C protocol in response to a read command in the one or more transactions.

16. The apparatus of claim 14, wherein the processor is further configured to:
clear an interrupt source in response to a read command transmitted by a bus master in the one or more transactions.

17. A method for bus arbitration performed at a master device, comprising:
configuring two or more slave devices to ignore signaling state of a data line of a serial bus while transmitting their respective slave addresses during bus arbitration transactions;
detecting an in-band interrupt request from the serial bus when the serial bus is operated in accordance with Improved Inter-Integrated Circuit (I3C) protocols;
receiving a composite address generated by the two or more slave devices when the two or more slave devices are participating in a first bus arbitration transaction conducted in response to the in-band interrupt request;
identifying the two or more slave devices from zero-value bits in the composite address; and
initiating one or more transactions responsive to the in-band interrupt request.

18. The method of claim 17, wherein the two or more slave devices transmit their respective slave addresses concurrently over the data line of the serial bus during the first bus arbitration transaction.

19. The method of claim 17, further comprising:
reading a mandatory byte from at least one of the two or more slave devices after identifying the two or more slave devices, wherein the mandatory byte is provided in accordance with an I3C protocol governing in-band interrupts.

20. The method of claim 17, further comprising:
clearing an interrupt source in at least one of the two or more slave devices after identifying the two or more slave devices.

21. The method of claim 17, further comprising:
providing a negative acknowledgement after receiving the composite address in the first bus arbitration transaction.

22. The method of claim 17, further comprising:
assigning a slave address to each of a plurality of slave devices coupled to the serial bus, wherein each of the plurality of slave devices is uniquely identifiable by location of a zero-value bit in its assigned slave address; and
configuring each of the plurality of slave devices with its assigned slave address.

23. An apparatus configured for data communication, comprising:
a bus interface circuit having a line driver configured to couple the apparatus to a data line of a serial bus operated in accordance with Improved Inter-Integrated Circuit (I3C) protocols; and
a processor configured to:
configure two or more slave devices to ignore signaling state of the data line while transmitting their respective slave addresses during bus arbitration transactions;
detect an in-band interrupt request from the serial bus;
receive a composite address generated by the two or more slave devices when the two or more slave devices are participating in a first bus arbitration transaction conducted in response to the in-band interrupt request;
identify the two or more slave devices from zero-value bits in the composite address; and
initiate one or more transactions responsive to the in-band interrupt request.

24. The apparatus of claim 23, wherein the two or more slave devices transmit their respective slave addresses concurrently over the data line of the serial bus during the first bus arbitration transaction.

25. The apparatus of claim 23, wherein the processor is further configured to:
read a mandatory byte from at least one of the two or more slave devices after identifying the two or more slave devices, wherein the mandatory byte is provided in accordance with an I3C protocol governing in-band interrupts.

26. The apparatus of claim 23, wherein the processor is further configured to:
clear an interrupt source in at least one of the two or more slave devices after identifying the two or more slave devices.

27. The apparatus of claim 23, wherein the processor is further configured to:
provide a negative acknowledgement after receiving the composite address in the first bus arbitration transaction.

28. The apparatus of claim 23, wherein the processor is further configured to:
assign a slave address to each of a plurality of slave devices coupled to the serial bus, wherein each of the plurality of slave devices is uniquely identifiable by location of a zero-value bit in its assigned slave address; and
configure each of the plurality of slave devices with its assigned slave address.

* * * * *